United States Patent
Du

(10) Patent No.: US 10,949,882 B2
(45) Date of Patent: Mar. 16, 2021

(54) REAL-TIME AND CONTEXT BASED ADVERTISEMENT WITH AUGMENTED REALITY ENHANCEMENT

(71) Applicant: INTEGEM INC., Cupertino, CA (US)

(72) Inventor: Eliza Y. Du, Cupertino, CA (US)

(*) Notice: Subject to any disclaimer, the term of this patent is extended or adjusted under 35 U.S.C. 154(b) by 362 days.

(21) Appl. No.: 15/479,277

(22) Filed: Apr. 4, 2017

(65) Prior Publication Data

US 2017/0287007 A1 Oct. 5, 2017

Related U.S. Application Data

(60) Provisional application No. 62/317,554, filed on Apr. 3, 2016, provisional application No. 62/322,358, filed on Apr. 14, 2016.

(51) Int. Cl.
*G06Q 30/02* (2012.01)
*G06K 9/00* (2006.01)
*G06K 9/46* (2006.01)
*G06T 19/00* (2011.01)
*G06T 19/20* (2011.01)
*H04N 7/15* (2006.01)

(52) U.S. Cl.
CPC ..... *G06Q 30/0261* (2013.01); *G06K 9/00671* (2013.01); *G06K 9/00711* (2013.01); *G06K 9/46* (2013.01); *G06Q 30/0241* (2013.01); *G06Q 30/0271* (2013.01); *G06Q 30/0276* (2013.01); *G06T 19/006* (2013.01); *G06T 19/20* (2013.01); *G06Q 30/0269* (2013.01); *H04N 7/15* (2013.01)

(58) Field of Classification Search
CPC ... G06T 19/006; G06T 19/20; G06Q 30/0261; G06Q 30/0276; G06Q 30/0271; G06Q 30/0241; G06Q 30/0269; G06K 9/00671; G06K 9/00711; G06K 9/46; H04N 7/15
USPC .......................................... 345/419; 705/14.58
See application file for complete search history.

(56) References Cited

U.S. PATENT DOCUMENTS

| | | | |
|---|---|---|---|
| 9,420,319 B1* | 8/2016 | Story, Jr. ............ | H04N 21/4668 |
| 2007/0255693 A1* | 11/2007 | Ramaswamy ...... | G06F 16/3331 |
| 2015/0091891 A1* | 4/2015 | Raheman ................ | G06F 3/017 |
| | | | 345/419 |
| 2016/0027215 A1* | 1/2016 | Burns ................ | G02B 27/0172 |
| | | | 345/419 |

(Continued)

FOREIGN PATENT DOCUMENTS

WO WO-03003811 A1 * 1/2003 .......... G06F 11/3447

OTHER PUBLICATIONS

Wikipedia, Augmented reality. (Printed Jan. 7, 2019 from: https://en.wikipedi3.org/wiki/Augmented reality) (Year: 2019).*

(Continued)

*Primary Examiner* — Tarek Elchanti

(57) ABSTRACT

Disclosed herein are methods and systems for real-time content-matched advertisement in an augmented reality environment. In particular, a plurality of integrated images of an extracted real life object in a virtual environment is provided at a computer device to a user. The plurality of integrated images comprises one or more advertisement elements that are determined using a comprehensive content matching mechanism. The comprehensive content matching mechanism is based on a plurality of factors comprising advertisement content, user preference information, and context information.

19 Claims, 17 Drawing Sheets

(56) References Cited

U.S. PATENT DOCUMENTS

| | | | |
|---|---|---|---|
| 2016/0189426 A1* | 6/2016 | Thomas | G06T 19/006 345/633 |
| 2016/0198097 A1* | 7/2016 | Yewdall | H04N 5/265 348/659 |
| 2016/0210602 A1* | 7/2016 | Siddique | G06Q 20/0453 |
| 2016/0253842 A1* | 9/2016 | Shapira | G02B 27/017 345/633 |
| 2016/0350973 A1* | 12/2016 | Shapira | G06T 19/006 |

OTHER PUBLICATIONS

LexInnova, Virtual Reality, 2015 (Year: 2015).*
Shanshan Li, Assessing The User Experience When Using Mobile Augmented Reality in Advertising, 2014 (Year: 2014).*

* cited by examiner

REAL-TIME AND CONTEXT BASED ADVERTISEMENT WITH AUGMENTED REALITY ENHANCEMENT

CROSS-REFERENCE TO RELATED APPLICATION

The application claims priority under 35 U.S.C. § 119(e) to U.S. Provisional Patent Application No. 62/317,554, filed on Apr. 3, 2016 and entitled "A Real-time Image and Signal Processing System for Augmented Reality-based Communication," and to U.S. Provisional Patent Application No. 62/322,358, filed on Apr. 14, 2016 and entitled "A Real-time Immersive Advertisement System Using Augmented Reality-based Communication," each of which is hereby incorporated by reference herein in its entirety.

TECHNICAL FIELD

The disclosure generally relates to systems, devices and methods for context based content-matching advertisement that includes real-time augmented reality (AR) enhancement.

BACKGROUND

Advertising is a multi-billion dollar industry. Daily human lives are filled with numerous advertisements in various forms: image, video, audio and interactive. However, money and resources are often wasted because the advertisements are not delivered to the right audience or not delivered at the right time.

What is needed in the art are improved systems and methods for context-based and content matched.

SUMMARY

Disclosed herein are methods and systems for context based content-matching advertisement that includes real-time augmented reality (AR) enhancement.

In one aspect disclosed herein is a method for providing immersive advertisement. The method comprises the steps of providing, at a computer device to a user, a plurality of integrated images of an extracted real life object in a virtual environment, where the plurality of integrated images comprises one or more advertisement elements, the one or more advertisement elements being determined using a comprehensive content matching mechanism; and where the comprehensive content matching mechanism is based on a plurality of factors comprising advertisement content, user preference information, and context information.

In some embodiments, the user preference information comprises user specified information, user biographical information, user behavior information, user activities, user psychological status, user socioeconomic status, user real-time request information, or combinations thereof.

In some embodiments, the context information comprises date and time information, communication context, content context, advertiser context, geolocation context, presentation context, or combinations thereof.

In some embodiments, the method further comprise identifying the user preference information, the user preference information comprising user specified information, user biographical information, user behavior information, user activities, user psychological status, user socioeconomic status, user real-time request information, or combinations thereof; identifying the context information, the context information comprising communication context, content context, advertiser context, location context, or presentation context; and determining the one or more advertisement elements by searching a collection of advertisement content based on the user preference information and the context information.

In some embodiments, the determining step further comprises: determining the one or more advertisement elements based on the advertiser context.

In some embodiments, the advertiser context comprises advertiser-specified content matching criteria including favored or disfavored presentation forums or pricing information.

In some embodiments, the one or more advertisement elements are determined in a bidding process.

In some embodiments, the extracted real life object comprises multi-dimensional image information extracted by separating a real life object from its actual environment in one or more real-time captured images using a comprehensive characteristic-based mechanism, and the virtual environment is constructed from a plurality of images; and wherein each pixel in an integrated image is divided into multiple layers, each layer is determined using corresponding pixels in the extracted real life object and each image of the plurality of images of the virtual environment based on image relations between each pixel of the extracted real life object and a corresponding pixel of each image of the plurality of images of the virtual environment, and the image relations comprise at least a depth relation or a transparency relation.

In some embodiments, the one or more advertisement elements are embedded into the plurality of integrated images in real-time when extracting image information of the real life object, constructing the virtual environment, or determining layers of pixels in an integrated image.

In some embodiments, the method comprise providing, at the computer device and in real-time, one or more audio tracks, the one or more audio tracks comprising audio information associated with the plurality of integrated images.

In some embodiments, the plurality of integrated images forms a video comprising one or more audio tracks.

In some embodiments, the one or more audio tracks comprise audio information concerning the one or more advertisement elements.

In some embodiments, the one or more audio tracks comprise a translation audio track of the built-in audio track, the translation audio track being automatically selected in real-time from audio tracks in multiple languages based on the geographic location or a pre-determined setting of the computer device.

In some embodiments, the one or more advertisement elements are associated with a product or a service.

In some embodiments, the extracted real life object is selected from a plurality of extracted real life objects based on geographic location of the computer device or a preference set by a user of the computer device.

In some embodiments, the plurality of extracted real life objects includes a celebrity, an actor, an athlete, or a user of the computer device.

In some embodiments, the extracted real life object interacts with one or more elements of the virtual environment in the plurality of integrated images.

In some embodiments, the virtual environment comprises an element reflecting the location of the computer device.

In one aspect, disclosed herein is a computer system that comprises one or more processors; and a memory accessible to the one or more processors. The memory stores instructions executable by the one or more processors to: provide, at a computer device to a user, a plurality of integrated images of an extracted real life object in a virtual environment, where the plurality of integrated images comprises one or more advertisement elements, the one or more advertisement elements is determined using a comprehensive content matching mechanism; and where the comprehensive content matching mechanism is based on a plurality of factors comprising advertisement content, user preference information, and context information.

In one aspect, disclosed herein is a non-transitory computer-readable medium containing instructions that, when executed by a computer processor, cause the computer processor to: provide, at a computer device to a user, a plurality of integrated images of an extracted real life object in a virtual environment, where the plurality of integrated images comprises one or more advertisement elements, the one or more advertisement elements is determined using a comprehensive content matching mechanism; and where the comprehensive content matching mechanism is based on a plurality of factors comprising advertisement content, user preference information, and context information.

It would be understood that any embodiments disclosed herein can be applied, when applicable, in any aspect of the invention, alone or in any combination.

Details of one or more implementations are set forth in the accompanying drawings and the description below. Other features, aspects, and potential advantages will be apparent from the description and drawings, and from the claims.

DESCRIPTION OF DRAWINGS

Those of skill in the art will understand that the drawings, described below, are for illustrative purposes only. The drawings are not intended to limit the scope of the present teachings in any way.

Like reference symbols in the various drawings indicate like elements.

DETAILED DESCRIPTION

Overview

Figure 1A:
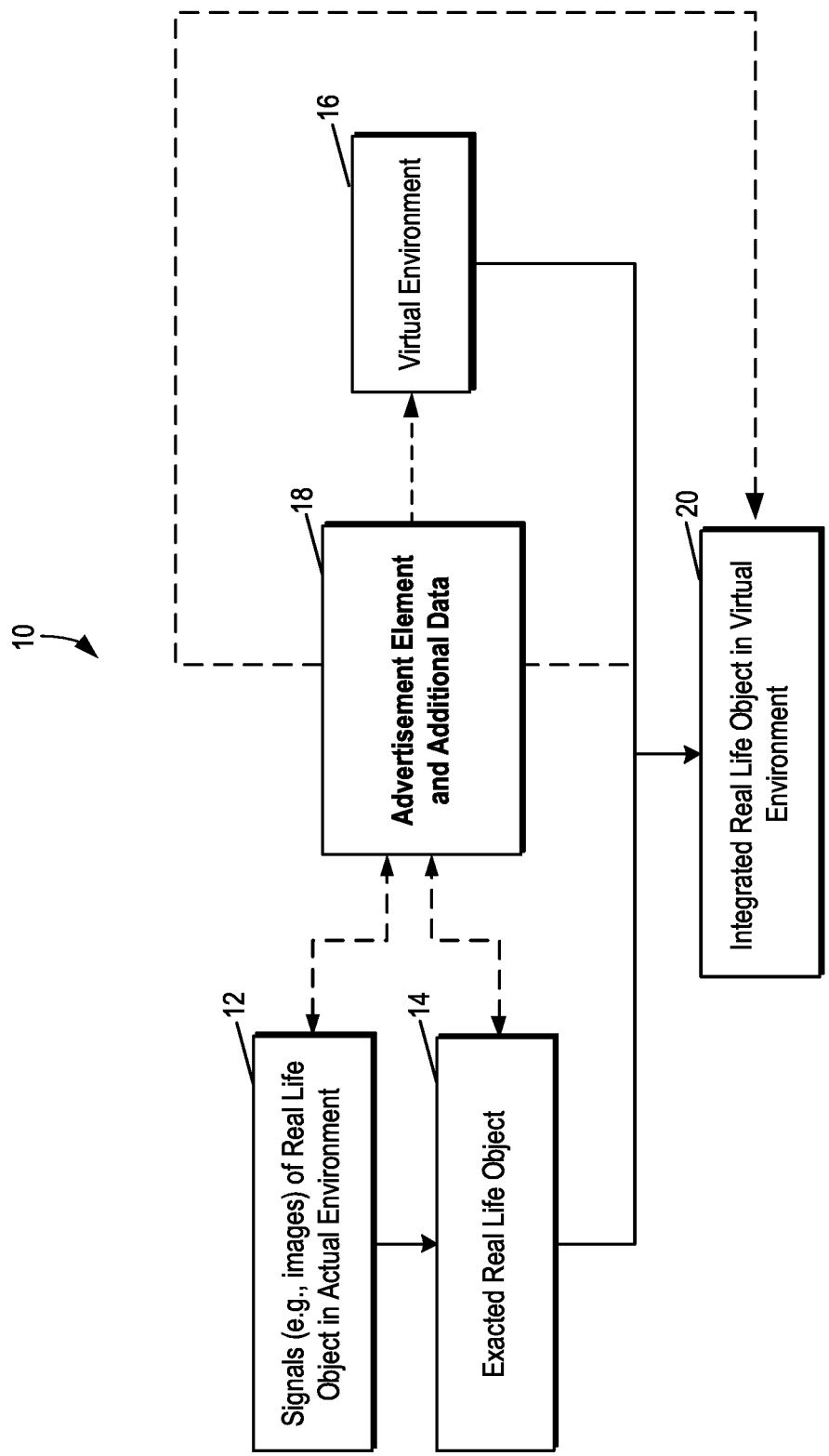
FIG. 1A depicts a block diagram of an example system for performing real-time image and signals processing.

FIG. 1A illustrates elements that are present in an exemplary AR-based real-time image and signal processing system 10. Signals such as images of a real life object are captured while the real life object is physically located in an actual environment (e.g., block 12). The captured images are then processed in real-time to extract image information of the real life object (e.g., block 14). A virtual environment (e.g., block 16) can be constructed previously or concurrently while the real life object is being extracted. The extracted real life object is then integrated with the selected virtual environment. Advertisement elements and additional data (e.g., block 18) can be added to any elements in system 10. The entire process can take place in real-time while images of the real life object are being captured, although in some embodiments, certain virtual environment elements can be constructed before-hand.

As disclosed herein, the term "images" can be used to refer to separate photos taken at discontinuous time points or image frames in a video. Unless otherwise specified, the terms "images" and "video" can be used interchangeably. A video is effectively a collection of multiple images that are captured continuously.

As disclosed herein, the term "real-time" refers to functionalities being performed without little or no delay in time. For example, image extraction occurs in real-time when an image is being processed as soon as or shortly after the image has been captured. In some embodiments, the delay can be within a minute or within seconds. In some embodiments, the delay may be caused by hardware limit such as the speed of data transfer or image processing.

As disclosed herein, the terms "real life object" and "user" are sometimes used interchangeably. In some embodiments, the user is the real life object. In some embodiments, the user is an operator of the computer device and controls one or more of the functionalities including image capture.

As disclosed herein, the terms "signals" and "data" cam be used interchangeably. For example, they can include image, audio, video, text, spatial, geographical, or any other information associated with the real life object. They also include metadata or other embedded information that reflect a state of the real life object. They can further include data that are indirectly associated with the real life object, for example, information such as images or videos that reflect the geolocation of the real life object. As disclosed herein, "signals" and "data" can include internal and/or external data. Here, internal data refer to those collected during the real-time capture of the real life object in its actual environment, including visual, audio and other types of information. External data refer to content beyond those collected in real-time, including but not limited to data already stored on a local user device, data from another user device (accessible via network connection), data stored on a server (e.g., including advertisement elements stored on an advertisement provisioning server), or data retrieved in real-time using network collection. Most examples disclosed herein refer to images, which, however, should not in anyway limit the scope of the invention.

As disclosed herein "secondary signals" are signals or data in other than those reflecting the real life object itself. Secondary signals can also include internal or external data. In some embodiments, secondary signals include non-visual signals such as audio sound track or external music files. In some embodiments, secondary signals include advertisement elements that can be incorporated with the extracted real life object, the virtual environment, or the final integrated images or videos.

At block 12, signals (e.g., images or audio) of a real life object is being captured, using, for example, a user device with an image/audio capturing device such as a camera. In some embodiments, the camera is an integral part of the user device. In some embodiments, the camera is an external hardware component that can be connected to the user device. In some embodiments, the user device is a network-enabled camera. Preferably, the camera is a depth camera. In some embodiment, the image/audio capturing device includes a set of cameras. As disclosed herein, the user device should be equipped with a CPU/GPU processor, a camera, a mic phone, a display, a speaker, a communication unit, and a storage. It includes but is not limited to a desktop computer, a laptop computer, a smartphone device, a personal digital associate, a network-enabled camera, a tablet, an AR glass, an AR hamlet, a VR glass, a smart TV, and etc. The camera can be a 3D camera, a regular RGB camera, an IR camera, a multiple spectrum camera, a hyperspectral camera, a 360 degree camera etc.

In some embodiments, the real life object is a person. In some embodiments, the real life object is an animal or an object. In some embodiments, a plurality of images is taken of the real life object. In some embodiments, the images are taken continuously and form a video. In all embodiments, the computer device for capturing image of the real life object is accessible to the real life object or a user of the computer device.

As disclosed herein, the real life object can be in any environment when images are being captured. There are no special requirements for the environment for image capturing. For example, a background screen of a uniform or near uniform color is not needed. In most embodiments, images of the real life object are capture as is when the real life object is in its actual physical environment. In some embodiments, images of the real life object are taken while the real life object is carrying out regular activities.

At block 14, while the images are being capture, image information of the real life object is extracted. In some embodiments, extraction is performed by separating the real life object from its actual environment, based on one or more differences in a characteristic between the real life object and the actual environment. In some embodiments, the characteristic can be a visual characteristic, including but not limited to a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof.

In some embodiments, the visual characteristic comprises a three-dimensional spatial characteristic.

In some embodiments, the characteristic can be a real-time learned or a pre-learned feature relating to the real life object or the actual environment. A real-time learned or pre-learned characteristic includes but is not limited to, for example, color, shape, edge, light reflectance, light illuminance, motion, depth, material, contrast, or combinations thereof.

In some embodiments, extraction of the real life object is done on an image-by-image basis. This also applies to video extraction, which is done on a frame-by-frame basis. In some embodiments, multiple images are processed in parallel at the same time.

At block 16, a virtual environment is provided. In some embodiments, the virtual environment can be constructed prior to image extraction or even image capture. In some embodiments, the virtual environment can be constructed concurrently as image extract or image capture.

In some embodiments, the virtual environment is different from the actual environment. In some embodiments, the virtual environment is a modified version of the actual environment. In any embodiments, images for constructing the virtual environment can be modified image characteristics including but not limited size, shape, image quality, color, perspective, light, visual effect, or combinations thereof.

In some embodiments, the virtual environment can be the same as the actual environment, but one or more characteristics can be changed. For example, the actual environment can be processed to enhance certain elements to render a virtual environment. Additionally, the actual environment can be modified to enhance the image quality to render a virtual environment. In some embodiments, one or more elements of the actual environment are altered in visual characteristics such as color, shape, size, light and etc.

In some embodiments, the virtual environment can be the same as the actual environment, but its relations with the real life object are altered. In some embodiments, the real life object becomes much smaller or much larger in scale relative to its environment, as in the movie Alice in Wonderland. For example, a person who is drinking tea in the captured images can be shown within a tea cup in the final integrated image while the other elements of the environment remain unchanged.

In some embodiments, a server can provide collections virtual environment to a user. The virtual environment can be divided into different categories based on the themes present therein. Exemplary themes include but are not limited to nature, animals, space, movie, architecture, culture, travel, and etc. A user's selection for particular types of themes can be stored in user preference.

In some embodiments, the virtual environment comprises an image. In some embodiments, the virtual environment comprises a video. In some embodiments, multiple virtual environments can be included, each treated as a separate element during image or video integration.

At block 18, advertisement elements and optional secondary or additional signals are provided. The advertisement elements and secondary signals can both include internal or external data. Internal data refer to signals captured in at block 12. External data can be pre-stored on the local device or on a server. Exemplary form of advertisement elements and secondary signals include but are not limited to image, audio, video, text, spatial, geographical, or any other type of information. In most embodiments, advertisement elements are provided by a server. In some embodiments, advertisement material can be pre-created. In some embodiments, advertisement material is created in real-time at a user's request.

In some embodiments, secondary signals include non-visual signals such as audio signals, for example, sound information collected when capturing the image information of the real life object. In some embodiments, the audio signals include internal or existing audio signals or external audio signals. In some embodiments, internal or existing audio signals are obtained from the captured images or videos and subject to further processing (e.g., voice recognition and subsequent language translation). In some embodiments, audio signals of a video can be processed for enhanced sound effects. For example, ambient noises can be removed to enhance the voice of a real life object (e.g., a speaker during a conference call). In some embodiments, special sound effects can be added to a desirable voice. For example, a voice can be rendered to have a three-dimensional hollow effect to mimic sounds in an echoing environment.

In some embodiments, advertisement elements can be associated with a product or a service. In some embodiments, the advertisement elements include internal or existing audio signals or external audio signals. In some embodiments, the advertisement elements can be associated with the real life object (e.g., element 12 or 14). For example, the real life object can wear or hold a product comprising the advertisement elements. In some embodiments, the advertisement elements are added to virtual environment 16. For example, the advertisement elements can be displayed as part of the virtual environment. In some embodiments, the advertisement elements can be implemented integrated images or videos. For example, the advertisement elements can be treated as another virtual environment, in addition to the existing virtual environment, during integration. In some environments, the advertisement elements can be added post-integration; for example, at the time when a user views the integrated image or video.

In some embodiments, advertisement elements are provided based on user preferences that are stored either locally on a user device or on a server (e.g., as part of a user profile). In some embodiments, user preferences are determined by user shopping histories. In some embodiments, a user may specifically request a product, a service, a type of product, or a type of service. In some embodiments, general user information such as age and gender may be used as reference. In some embodiments, generally available trending information may be used.

Additionally and advantageously, advertisement elements are provided based on context information. Context information includes but is not limited to communication context, advertisement content context, presentation context and etc. For example, if advertisement is presented during a conference meeting at a company, advertisements may include content of products and services relating to the specific industry of the company. When an advertisement is to be presented as online ads embedded in a public forum such as a web site or web page, the content of the web site and/or web page can be taken into consideration. No advertisement will be provided if the content on such web site and/or web page is deemed inappropriate. Content that is inappropriate includes but is not limited to religious fanaticism, terrorism, pornography and etc. The criteria can be set by the server providing the advertisement content. In some embodiments, an advertiser may set criteria for content that it does not want to be associated with.

In some embodiments, when multiple advertisers can provide the same or similar suitable content, a bidding process may be implemented to select the advertisement content.

Figure 1B:
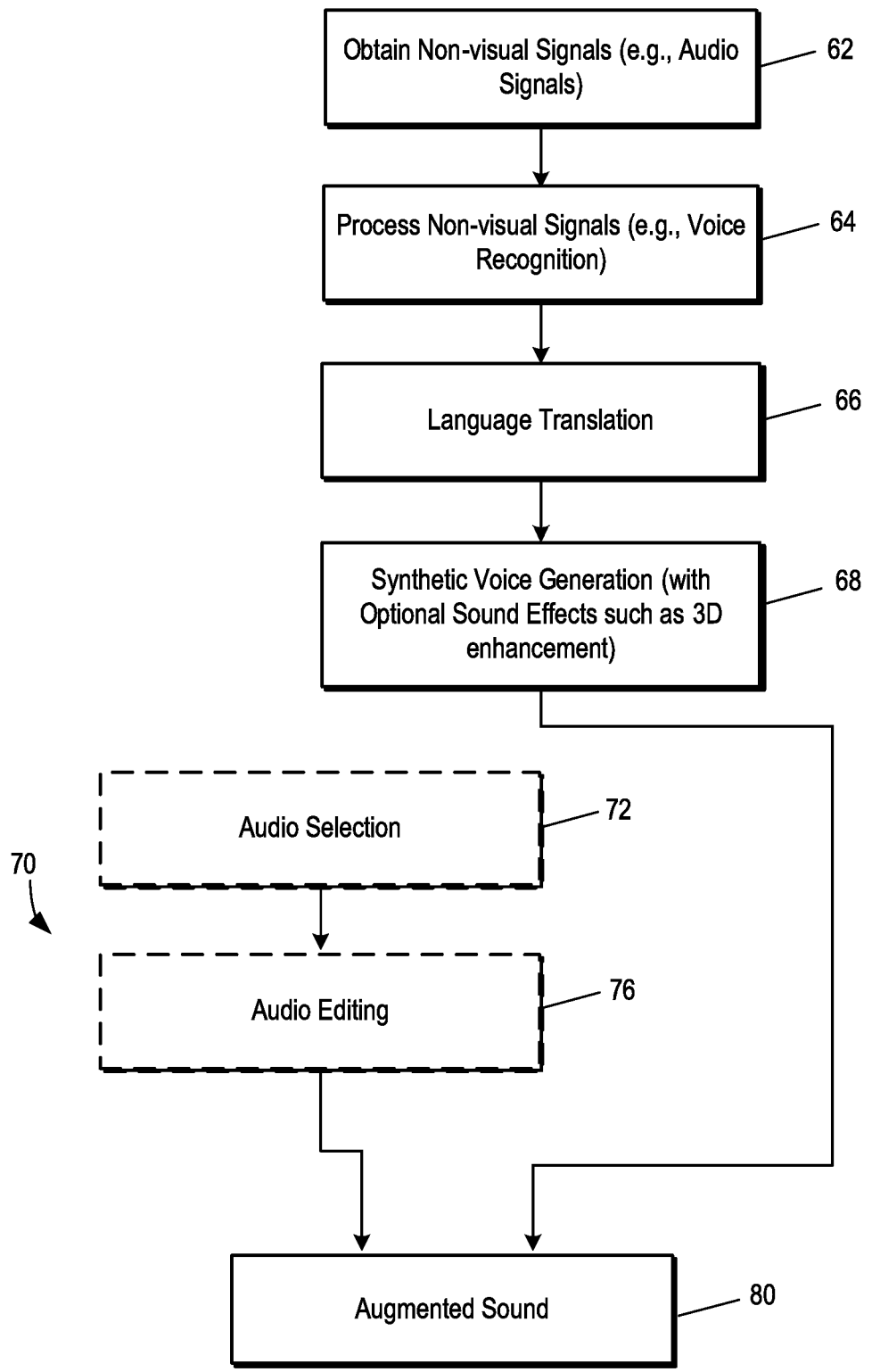
FIG. 1B depicts an example method illustrating an embodiment for performing real-time image and signals processing.

In some embodiments, external audio signals can be added to existing audio signals. For example, a user can choose to play background music during a video conference call. In some embodiments, external audio signals are used to replace existing audio signals (e.g., audio signals collected while capturing images of the real life object). Such audio signals (external or internal) can be associated with any elements in the system (e.g., block 12, 14, 16 and 20). In some embodiments, the audio signals are associated with virtual environment. In some embodiments, the audio signals can be added to integrated images. An exemplary process for implementing audio signals (e.g., as real-time translation) is depicted in FIG. 1B.

At block 20, the extracted real life object and the virtual environment are integrated or combined to render images or videos of a real life object within the virtual environment. To achieve integration, relations between the extracted real life object and the virtual environment will be defined. In some embodiments, the relations are defined concurrently as image extraction and/or virtual environment construction. In some embodiments, the relations are defined once image information of the real life object is extracted and the virtual environment is constructed.

In some embodiments, the system or user provides a general pre-defined guideline to the relations. In some embodiments, the relations are entirely defined automatically by the system based on information from the extracted real life object and the virtual environment. In some embodiments, a user can provide real-time adjustment to re-define or modify the relations between the extracted real life object and the virtual environment during the integration process.

In some embodiments, relations between the extracted real life object and the virtual environment include depth relation. For example, the extracted real life object can be partially or entirely "in front of" or "behind" an element of the virtual environment. In some embodiments, the extracted real life object can be partially or entirely "in front of" one element but partially or entirely "behind" another element of the same virtual environment. In some embodiments, the depth relations between all or a portion of the extracted real life object changes temporally with time progression between different images. In some embodiments, the depth relations between all or a portion of the extracted real life object changes spatially over different elements in the same image.

In some embodiments, relations between the extracted real life object and the virtual environment include a transparency relation. For example, the extracted real life object can be partially or entirely transparent relative to an element of the virtual environment. In some embodiments, the transparency relations between all or a portion of the extracted real life object changes temporally with time progression between different images. In some embodiments, the transparency relations between all or a portion of the extracted real life object changes spatially over different elements in the same image.

Processing Secondary Signals

FIG. 1B illustrates a process for processing secondary signals such as non-visual signals. Process 60 shows an example for obtaining non-visual signals from captured video data. All steps performed here can be implemented through signal processing module 128 depicted in FIG. 1C.

At step 62, the video capture by a user device is processed to extract audio information, which includes but is not limited to, for example, ambient sound, the voice or noise of a real life object, and any other audio information.

At step 64, the non-visual signals are further processed. For example, ambient sound and other noises can be reduced or eliminated to enhance the voice or noise of a real life object. The enhanced audio signals can then be subject to specialty programs such as a voice recognition program to detect the language and recognize the content of the audio signals.

At step 66, during a conference call, if one speaks in a language that is not understood by one or more who are also present at the conference call, the language can be automatically translated into a language the other attendees would understand. In some embodiments, subtitle can be provided on the display to enhance understanding.

At step 68, synthetic voice generating methods can be used to create an audio translation of the audio signals obtained at step 62. In some embodiments, a user can choose to set a preference for a certain type of voice and accent. In some embodiments, the audio translation file can be optionally enhanced for additional sound effects such as three-dimensional echoing sound effect.

In some embodiments, as illustrated by process 70, external audio signals can be added. Here external audio signals are those that are not part of the captured video file. For example, at step 72 a user can select his or her preferred music as background music for a video created using the method disclosed herein. In some embodiments, a user may select a preferred piece of music as background sound during a conference call.

At step 76, the selected piece of music can be edited or processed to better fit an intended purpose. For example, only a segment of a music piece may be selected as music soundtrack for a video. Additionally, a selected piece music can be tuned down before it can be used as background music for a video conference call. The examples provided herein refer to a two participant conferencing system. However, the method and system disclosed herein can be applied to more than two participants, including three or more, five or more, ten or more, twenty or more, fifty or more, or hundreds or more, so long as the conferencing system can support the number of participants.

At step 80, external audio signals and internal audio signal are combined to create augmented sound.

Exemplary System

As illustrated above in the exemplary embodiment in FIG. 1A, information flow can be divided into a number of blocks: captured signals 12, extracted real life object 14, virtual environment 16 and integrated image 20. Functionalities associated with these different information blocks can be performed by one or more computer devices in any combinations (e.g., data processed at one device can be transferred to another device for further or additional processing).

Figure 1C:
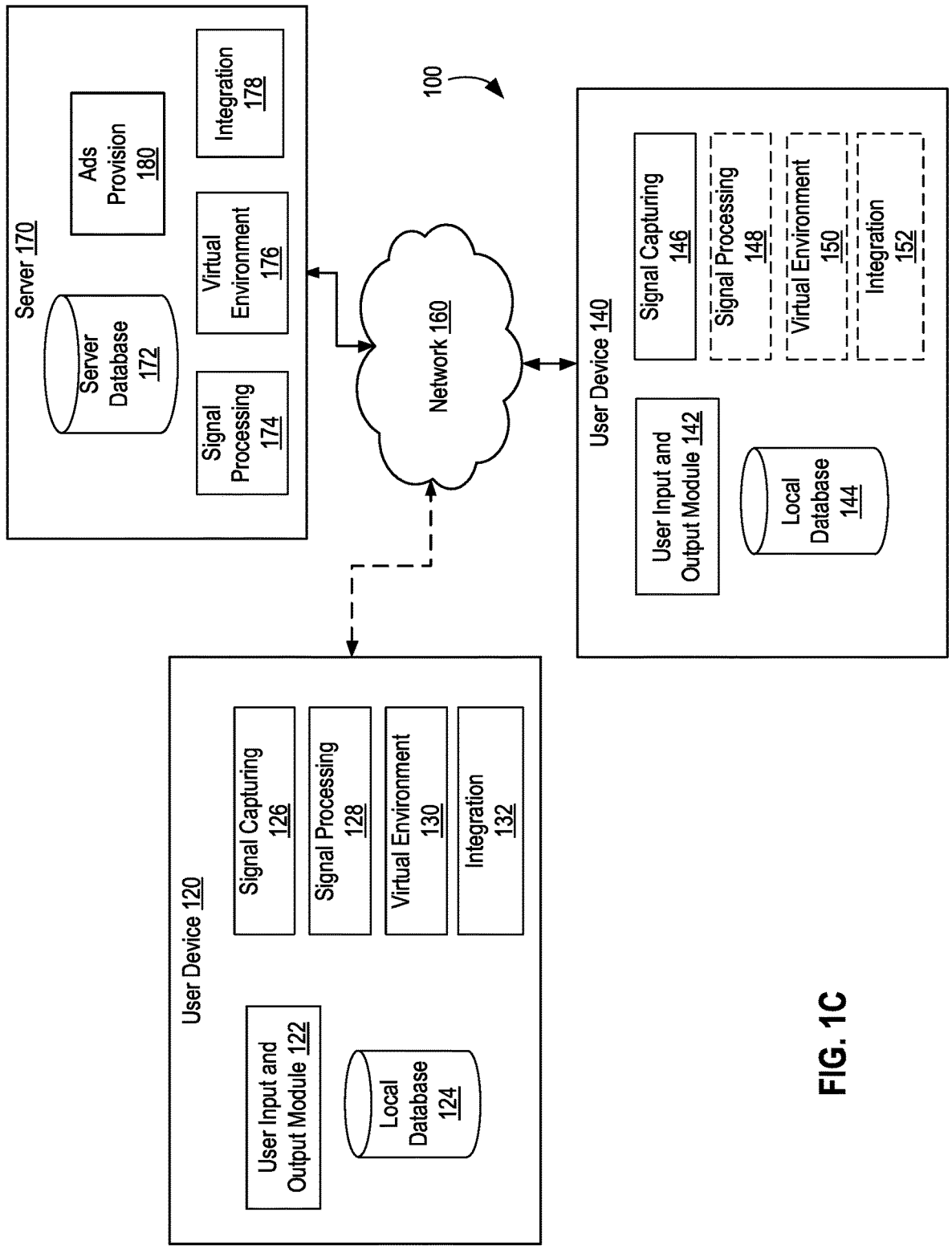
FIG. 1C depicts an example system for real-time image and signals processing.

FIG. 1C illustrates an exemplary system 100 for carrying out the functionalities disclosed herein. Here multiple user devices (e.g., 120 and 140) are connected to a server device 170 via network 160. Information processing takes place on one or more of the devices illustrated.

User device 120 depicts a local device (e.g., a device that is accessible to a real life object) equipped with multiple functionalities. In particular, user device 120 comprises a user input and output (I/O) module 122, a local database 124, and all functional modules (e.g., modules 126, 128, 130 and 132) for capturing images of a real life object, extracting the real life object, constructing a virtual environment and integrating extracted the real life object with virtual environment.

In some embodiments, user device 120 includes a user input and output module (I/O module) 122. For example, I/O module 122 can receive user input to user device 120 and present output from user device 102, using text, audio, video, motion, and/or haptic output mechanisms. For example, I/O module 122 can receive a gesture input, a body movement, or a voice input from a user. In some embodiments, I/O module 122 is also configured to detect and track eye movement, facial expression and etc. Also for example, I/O module 122 receive touch input from a touch sensitive display of user device 120. In other embodiments, I/O module 122 can be coupled to other input devices, such as a keyboard, mouse, a monitor, touch sensitive screen, a speaker and etc., and receive user input from these devices. In some embodiments, I/O module 122 includes a keyboard, mouse, a monitor, touch sensitive screen, a speaker and etc. as an integral part of I/O module 122 or user device 120. In some embodiments, user device 120 can receive multiple types of user input.

In some embodiments, I/O module 122 can also present audio, visual, motion, and/or haptic output to the user. For example, I/O module 122 display integrated images or videos on a monitor a user of device 120. In some embodiments, I/O module 122 can present GUIs that enable or support the functionality of one or more of the real-time image and signal processing methods/systems described herein, including but not limited to signal capturing module 126, signal processing module 128, virtual environment module 130 and integration module 132. In some embodiments, the user input and output module includes a plurality of menu commands, each corresponding to the functionality of one or more of the query processing modules.

In some embodiments, I/O module 122 allows a user to locate information that is needed for image processing. In embodiments, menu options can be provided such that a user can select one or more options to initiate one or more functions. For example, a user can click an icon to start image capturing process. Also for example, multiple categories of virtual environment images can be provided via menu options.

In some embodiments, a user may use I/O module 122 to request information that is available either on the local user device 120 or can be obtained via network connection from service device 170 or another user device 140. For example, I/O module 122 can allow a user to use voice command to request a certain type of virtual environment (e.g., European medieval castle images). Once the images are delivered (either locally or via network connection), a user can request that the images be processed to construct a virtual environment.

In some embodiments, a user may use I/O module 122 to manage various functional modules. For example, a user can request via use I/O module 122 to change the virtual environment while a real-time communication is in process. A user can do so by select a menu option or type in a command discretely without interrupting the communication.

When methods/systems disclosed herein are used for image or video processing and editing, a user can use any type of input to direct and control the process.

In some embodiments, user device 120 further comprises a local database 124. For example, local database can store captured images, partially or fully processed images (e.g., extracted real life object and images for virtual environment), or partially or fully integrated images. In some embodiments, local database 124 stores user specific information; for example, a user can store information of one or more preferred virtual environment. In some embodiments, local database 124 stores information retrieved from another device or a server. In some embodiments, local database 124 stores information retrieved from internet searches.

In some embodiments, local database 124 sends data to and receives data from one or more of the functional modules, including but not limited to signal capturing module 126, signal processing module 128, virtual environment module 130, and integration module 132.

In some embodiments, user device 120 comprises signal capturing module 126. For example, signal capturing module 126 can include an image capturing device such as a camera. In some embodiments, the camera is depth enabled. In some embodiments, two or more cameras are used. In some embodiments, a built-in or an external microphone can be used for audio collection. In some embodiments, signal capturing module 126 captures multiple images. In some embodiments, signal capturing module 126 captures a video continuously.

As disclosed herein, signal capturing module 126 captures images of a real life object in the actual environment where the real life object is physically located. In some embodiments, the real life object is a user of user device 120. In some embodiments, the user is not the real life object, but controls user device 120 to capture images of an object that is accessible to signal capturing module 126. For example, the real life object can be a celebrity who is being photographed by a user operating signal capturing module 126.

The methods and systems disclosed herein are advantageous because they do not require a real life object to be in a specific type of environment to aid image processing.

In some embodiments, user device 120 comprises an signal processing module 128. For example, signal processing module 128 extracts a real life object from images captured by module 126 by separating image information of the real life object from its actual environment. The extraction utilizes a comprehensive characteristic-based mechanism, including artificial intelligence based mechanisms. The comprehensive characteristic-based mechanism recognizes one or more differences in a particular characteristic between the real life object and the actual environment. For example, a characteristic can include and is not limited to a visual characteristic of the real life object or the actual environment captured in the video clip, a real-time learned characteristic of the real life object or the actual environment, or a pre-learned feature relating to the real life object or the actual environment. In some embodiments, a visual characteristic can include but is not limited to comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic.

In some embodiments, a real-time learned characteristic includes but is not limited to color, shape, edge, light reflectance, light illuminance, exposure, brightness, shadow, highlight, contrast, blackpoint, motion, depth, material, or combinations thereof. In some embodiments, a pre-learned feature also includes but is not limited to color, shape, edge, light reflectance, light illuminance, exposure, brightness, shadow, highlight, contrast, blackpoint, motion, depth, material or combinations thereof.

An extraction process as disclosed herein can be completed in one round or in multiple rounds. In some embodiments, signal processing module 128 performs a round of rough extraction first before carrying out one or more additional rounds of fine extraction. For example, rough extraction can trace an outline for the real life object while fine extraction can refine the edges separating the real life object and its actual environment. In some embodiments, one or more rounds of fine extraction can also identify a region within the outline of the real life object that is in fact part of the environment and subsequently remove the region from the real life object.

In some embodiments, in addition to image extraction, signal processing module 128 can also evaluate and modify images.

In some embodiments, signal processing module can process non-visual signals such as audio signals, as illustrated in FIG. 1C.

In some embodiments, user device 120 comprises a virtual environment module 130. Virtual environment module 130 can create and modify a virtual environment for subsequent image integration. For example, virtual environment module 130 can construct a virtual environment based on one or more images. A virtual environment can be two-dimensional or three-dimensional. A virtual environment can include features that are not present in the images on which the virtual environment is based. For example, virtual environment module 130 can alter or adjust one or more elements in the virtual environment by modifying the corresponding images. In some embodiments, such modifications or adjustments are made based on one or more features of the real life object such that the extracted real life object and virtual environment can be more effectively integrated. An exemplary modification or adjustment includes but is not limited to scaling, change of orientation, change of shape, change of color, image quality adjustment (e.g., exposure, brightness, shadow, highlight, contrast, or blackpoint), and etc. The modification or adjustment can be made locally on individual elements within the virtual environment or globally on the entire virtual environment. In some embodiments, an virtual environment can be different from the actual environment. In some embodiments, an virtual environment can be the same as the actual environment with one or more elements in the virtual environment being modification for subsequent image integration.

The functionalities of virtual environment module 130 and signal processing module 128 share many similarities and, in some embodiments, they may be combined.

In some embodiments, user device 120 comprises an integration module 130. Integration module 130 combines extracted real life object with the virtual environment to create integrated images. As illustrated in detail in connection with FIG. 1B, integration can occur on a pixel-by-pixel basis for both efficiency and accuracy.

In some embodiments, exemplary system 100 further comprises user device 140. In some embodiments, user device 140 can have the same functional modules as user device 120; e.g., user input and output module 142, local database 144, signal capturing module 146, signal processing module 148, virtual environment module 150 and integration module 152. When a functional module is present, it can be implemented similarly as in user device 140 or according to any applicable known technology.

In some embodiments, user device can have fewer functional modules and instead relies on a server 170 to provide one or more functionalities. As illustrated in FIG. 1D, other than signal capturing module 146, the other image integration related modules, including signal processing module 148, virtual environment module 150 and integration module 152, can be optional to user device 140. Effectively, these functionalities can be split between user device 140 and server 170 in any combination. For example, user device 140 can transmit captured images to server 170 for image processing (e.g., image extraction). In some embodiments, extracted real life object is integrated with a virtual environment on server 170. In some embodiments, extracted real life object can be transmitted back to user device to be integrated with a virtual environment. In some embodiments, a user can choose to provide a customized virtual environment. For example, user device can transmitting a selected virtual environment to server 170 before subsequent image integration takes place on server 170.

In some embodiments, a user can choose to turn on or off functionalities. For example, a user can elect to communicate with another in the actual environment where the user is physically located. For example, when communicating with a family member who is away, a user can choose to display the actual home environment without any alteration. The user can do so by leaving on only signal capturing module 146 while turning off the other functional modules. Additionally, a user can choose to turn on any of the remaining functional module.

In some embodiments, exemplary system 100 further comprises a server 170, Server 170 communicates with one or more user devices and include functional modules such as server database 172, signal processing module 174, virtual environment module 176, integration module 178, advertisement provision module 180, or variations thereof. In some embodiments, signal processing module 174, virtual environment module 176 and integration module 178 are similar to those disclosed herein in connection with user device 120 or user device 140. In some embodiments, these modules may perform differently on server 170 due to the server's enhanced computing power and storage space in comparison to a user device. For example, integration can take place in parallel in a higher number of pixels than a user device would allow.

Figure 2A:
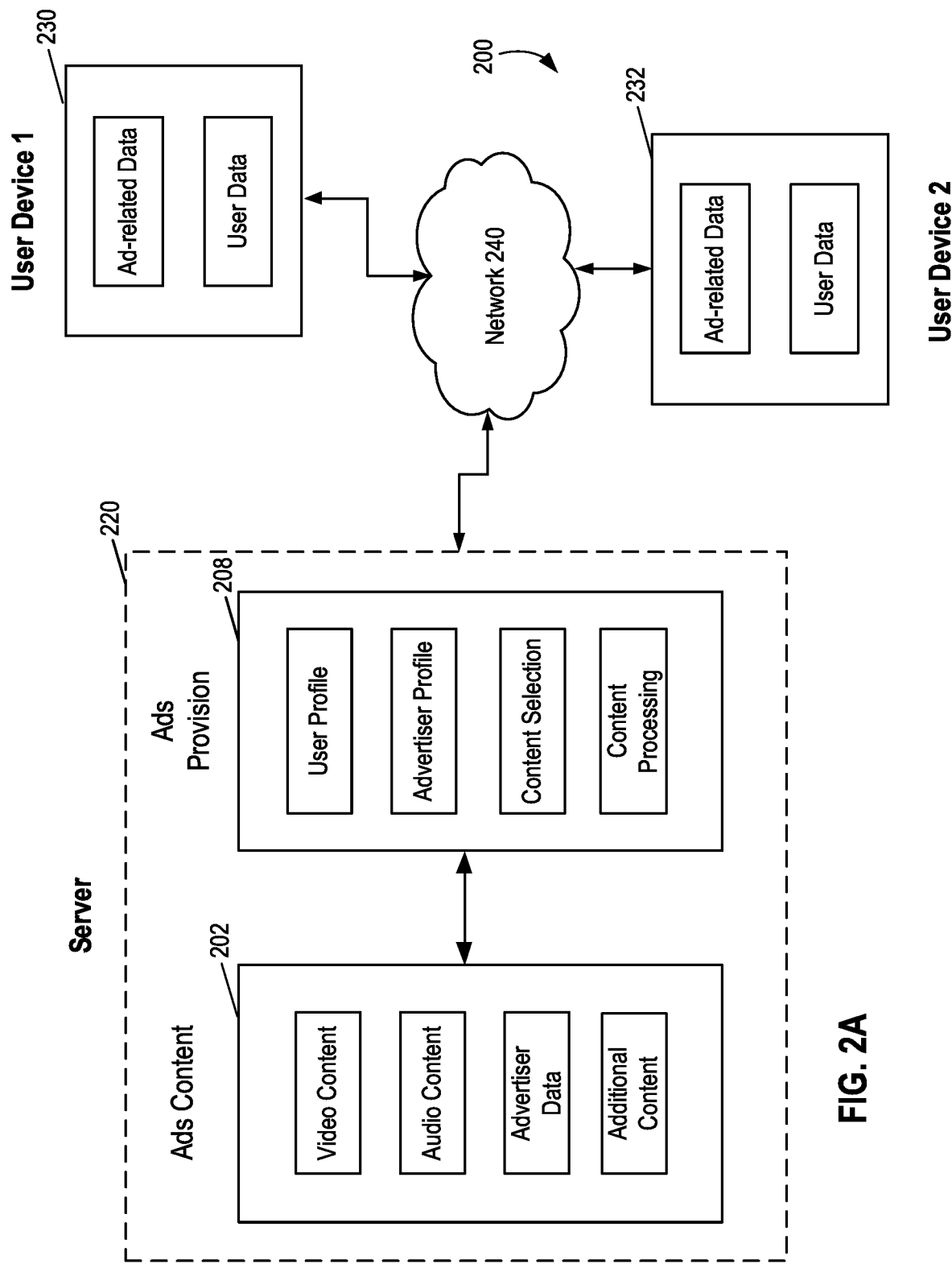
FIG. 2A depicts an example system for real-time and context based advertisement with augmented reality enhancement.

Advertisement provision module 180 determines whether advertisement content will be provided in connection with certain integrated images and/or videos. As disclosed in FIG. 1A, advertisement content is a type of secondary signals that can be incorporated into final integrated images and/or videos at various points along the integration process, for example during image extraction, construction of virtual environment or final integration. Additionally, advertisement elements can be added in real-time post integration at the time when the integrated images or videos are viewed.
Exemplary Advertisement System and Process FIG. 2A illustrates a sample system 200 for providing advertisement content. For example, a server 220 determines which advertisement content to provide to a user device (e.g., 230 or 232) via network 240 based on a number of factors.

In some embodiments, server 220 stores the advertisement content 202 in its local database. In some embodiments, server 220 receives the advertisement content from another server; for example, directly from the advertiser. Advertisement content includes but is not limited to video content, audio content, text conduct, and any other form of suitable content.

In some embodiments, server 220 includes an advertisement provision module 208. Advertisement provision module 208 interfaces between user devices (e.g., 230 and 232) and advertisement content 202. Advertisement provision module 208 identifies user preference information. Such user preferences can be stored either locally on a user device or on a server (e.g., as part of a user profile). In some embodiments, more general user information such as age and gender may be stored in user profiles on the server while more private information is stored locally on a user device. In some embodiments, user preferences are determined by user specified information, user biographical information, user behavior information, user activities, user psychological status, user social status, user socioeconomic status, user real-time request information, or combinations thereof. In some embodiments, generally available trending information may be used to predict user preference.

In some embodiments, context based information such as date and time information, communication context, content context, advertiser context, geolocation context, presentation context, or combinations thereof can also be used to identify the appropriate advertisement content for a viewer. Here, the viewer can either actively seek advertisement information or is passively presented with such information while engaging in other activities such as video conferencing or video gaming.

In some embodiments, a user may specifically request a product, a service, a type of product, or a type of service. In some embodiments, such requests can be made in real-time or previously specified in a file stored on server 220 or one or more user devices (e.g., 230 and 232).

In some embodiments, advertiser profiles can be created and stored on server 220. For example, an advertiser may specify forums or venues they would not want their advertisements to be shown. In addition, an advertiser can set pricing information for real-time bidding when multiple advertisers are determined to be suitable for a particular forum. As used herein, a forum can be a website, a web page, a video conference platform, or any form of platform where images and videos disclosed herein can be presented.

In some embodiments, advertisement content is selected based on user preferences and advertiser profiles. In some embodiments, advertisement content is selected based on generally available trending information. In some embodiments, advertisement content is further processed prior to being incorporated into the final integrated images and/or videos.

Figure 2B:
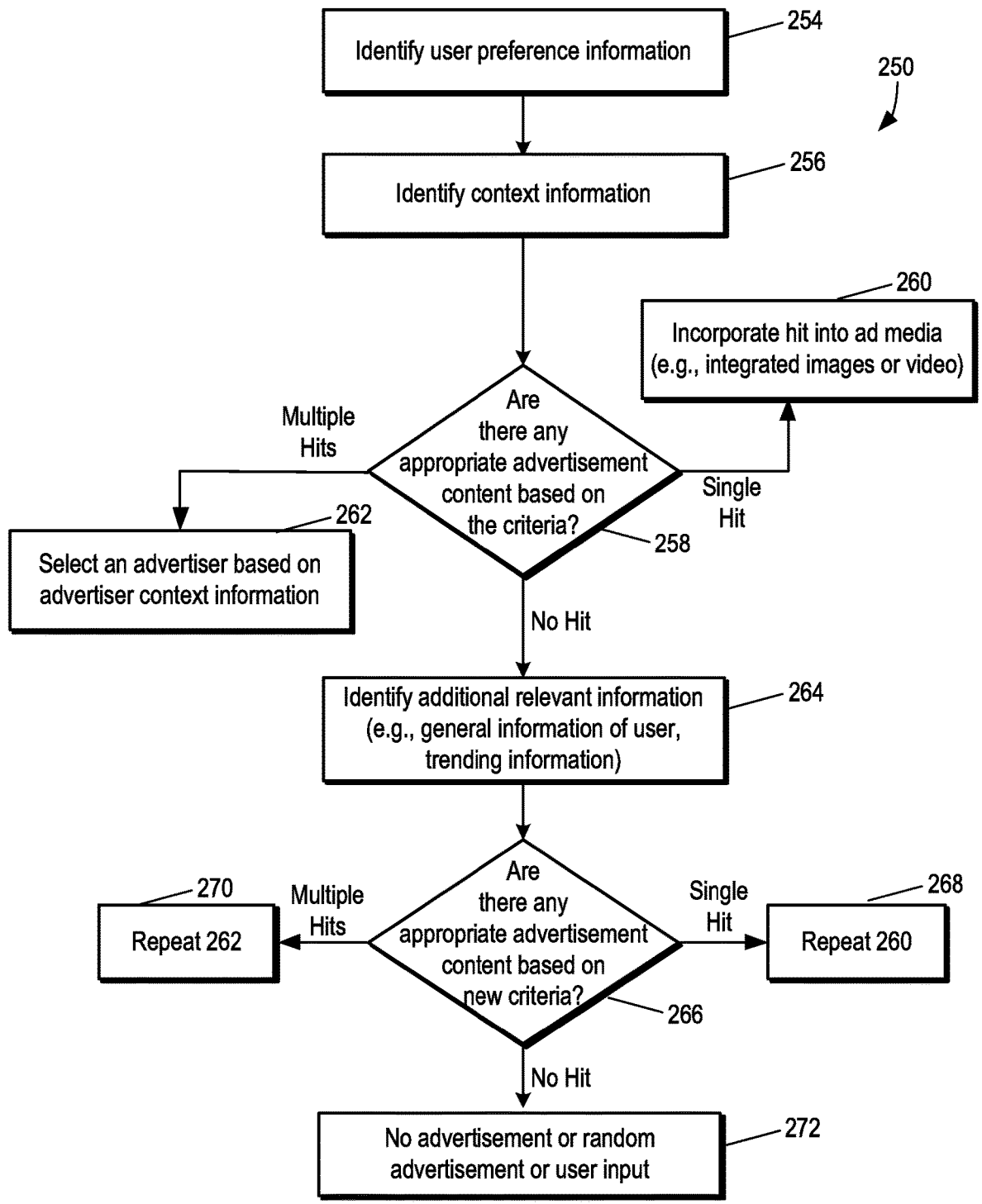
FIG. 2B depicts an example process for real-time and context based advertisement with augmented reality enhancement.

FIG. 2B depicts an example process 250 for content matching based on context information for advertising. Integrated images and videos as disclosed herein are used as media for embedding the advertisement elements. However, the context-based content matching advertisement methods are not limited to such and can be applicable to any media.

At step 254, user preference information is identified. User preference information includes user specified information, user biographical information, user behavior information, user activities, user psychological status, user socioeconomic status, status, user real-time request information, or combinations thereof. For example, user behavior information includes user habits, instant interactivity with the system, and etc. User activities include purchasing activities, browsing activities, social media activities, and etc. For example, psychological status can be obtained through facial expression and user behavior to know if a user is happy, angry, frustrated, etc. Advertisement content can be selected based on a perceived user's emotional state. Social status includes marital status, relationship status, active or inactive social engagement with friends, popularity, and etc. these info can be obtained from the user's social media info, user preference setting, etc. Socioeconomic status (SES) is an economic and sociological combined total measure of a person's work experience and of an individual's or family's economic and social position in relation to others, based on income, education, and occupation.

At step 256, context information is identified. Context information includes but is not limited to date and time information, communication context, content context, advertiser context, geolocation context, presentation context, or combinations thereof. For example, advertisement content presented to a user when the user is conducting company video conference may differ from the advertisement content presented the same user when the user is chatting to a friend or family member via video conference. Further, the advertisement content presented when the user is engaged in a video game may still be different from either content specified previously.

In some embodiments, the context associated with potential presentation forums is ascertained to identify appropriateness of the forums for presenting particular types of advertisement content. For example, websites associated with child development content accessible by young children will not display any advertisement content inappropriate for underage children.

At step 258, database containing advertisement content is searched to identify content that matches the identified user preference and context information.

At step 260, when only one single hit is identified, the content will be selected and incorporated into advertisement media (for example, the final integrated images or videos).

At step 262, when there are multiple hits identified, a bidding process may be initiated to identify an advertiser. In some embodiments, the bidding process is based on pricing information. In some embodiments, quality of the advertisement content may affect whether particular advertisement content may be selected.

At step 264, when no hits are identified, additional information may be used to determine advertisement content. Such additional information includes but is not limited to general user information such as gender, age, geolocation, and generally accessible information such as trending information associated with the gender, age, and geolocation. In some embodiments, weather and major events associated with a particular location can also be used to as criteria for searching database containing advertisement content.

At step 266, database containing advertisement content is further searched to identify content that matches the identified user preference and context information.

At step 268, method of step 260 is repeated: when only one single hit is identified, the content will be selected and incorporated into the final integrated images or videos.

At step 270, method of step 262 is repeated: when there are multiple hits identified, a bidding process may be initiated to identify an advertiser. In some embodiments, the bidding process is based on pricing information. In some embodiments, quality of the advertisement content may affect whether particular advertisement content may be selected.

At step 272, when no hits are identified, the system may decide to present no advertisement content or randomly present any advertisement content. In some embodiments, a user may request random advertisement content.

In some embodiments (not depicted in FIG. 2B), the selected advertisement content (e.g., as part of certain integrated images and videos) is presented with real-time translation, special sound effect, or music background. For example, the process illustrated in FIG. 1C can be used.

At any point, a user can turn on and off the advertisement feature, or specify any settings for a highly personalized advertisement experience. Additionally, a user can provide real-time feedback to request specific advertisement content or a particular type of advertisement content.

Active and Passive Advertisement

The systems and method disclosed herein can be applied to establish active and or passive advertisement experience.

Active advertisement experience can be associated with content creation as well as content provisioning. For example, a real estate agent can create flyers by inserting a real-time image of himself into photos of a piece of property using existing photos of the property without having to retake photos. Additionally, the method here allows existing photos of the property to be enhanced by real-time modification when generating the integrated image.

As another example, a user can create small budget advertisement on a local user device, with or without assistance from a server. For example, an owner of a flower shop, can incorporate images of their specialty flower arrangement into her favorite scenes in a video clip.

Figure 3A:
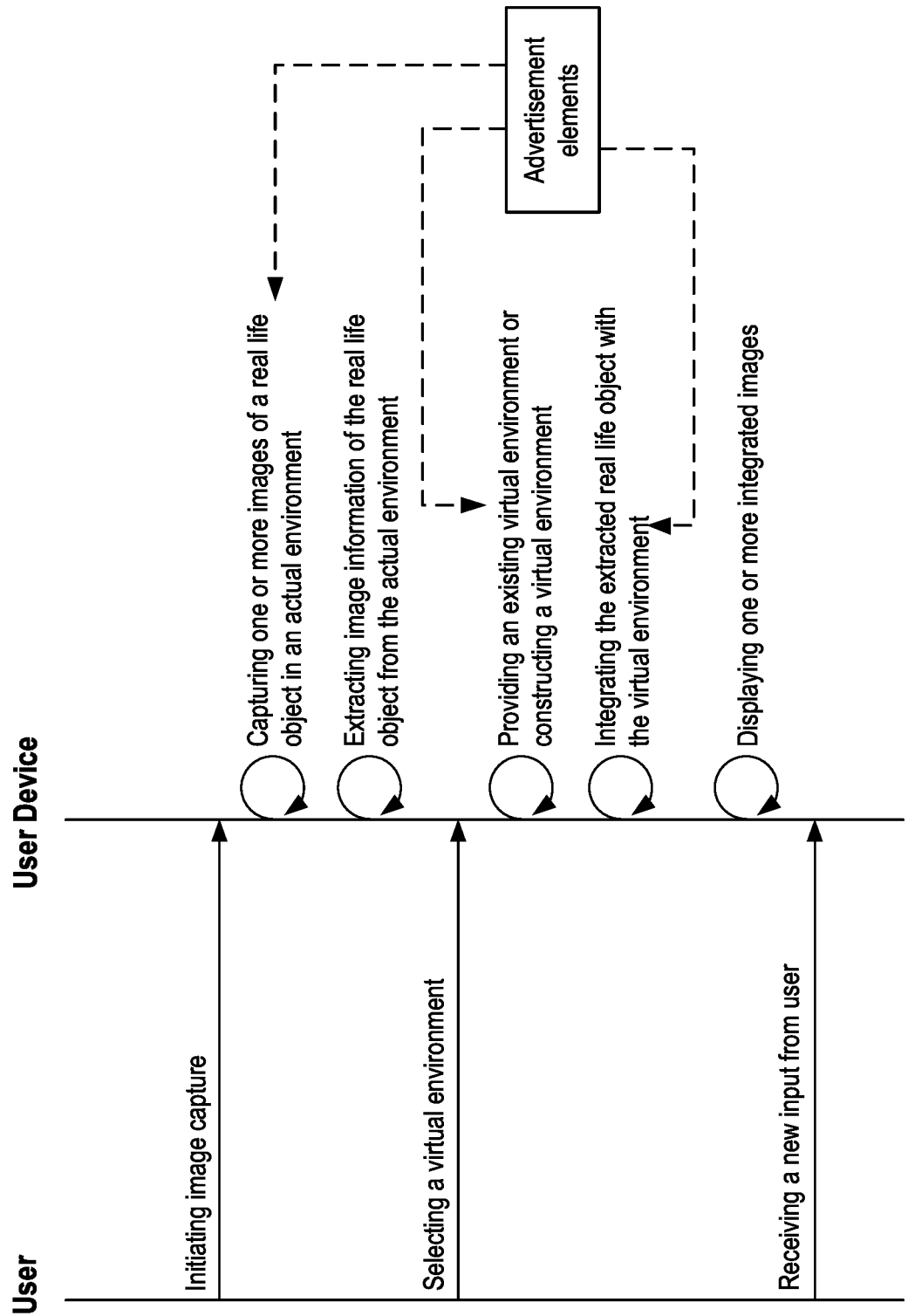
FIG. 3A depicts example steps and system for real-time image and signals processing between a user device and a server.
Figure 3B:
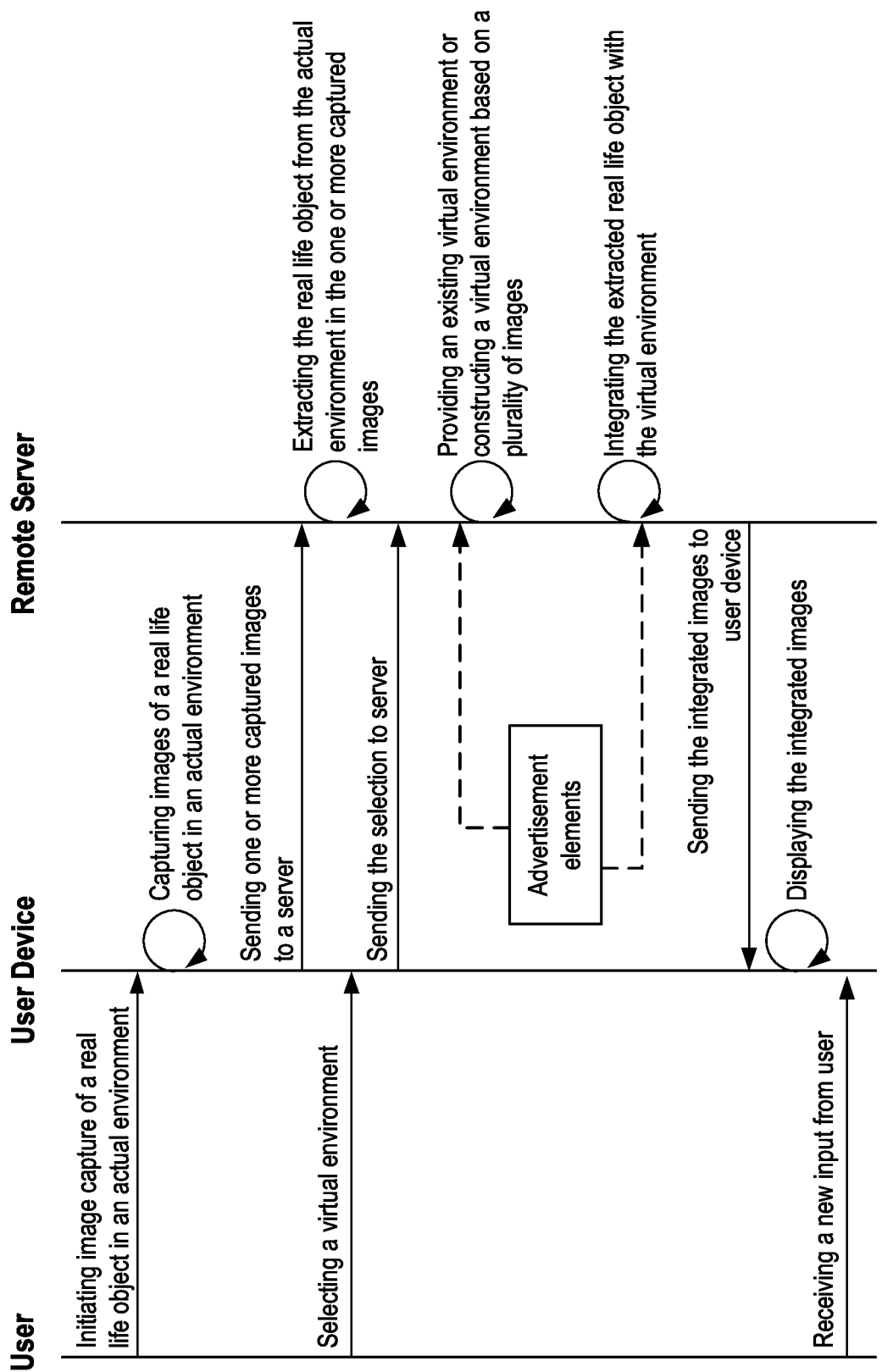
FIG. 3B depicts example steps and system for real-time image and signals processing between a user device and a server.
Figure 3C:
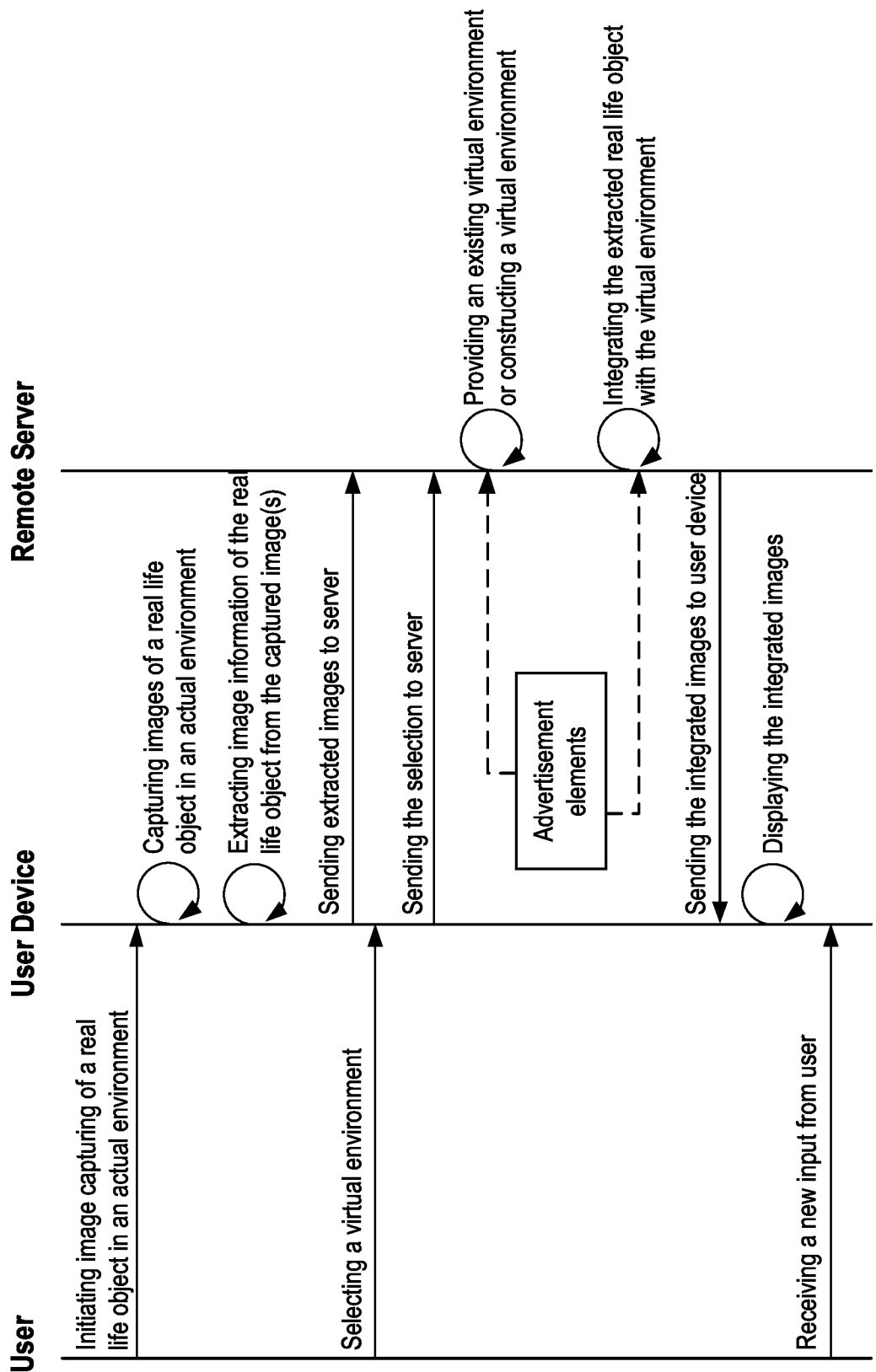
FIG. 3C depicts example steps and system for real-time image and signals processing between a user device and a server.
Figure 3D:
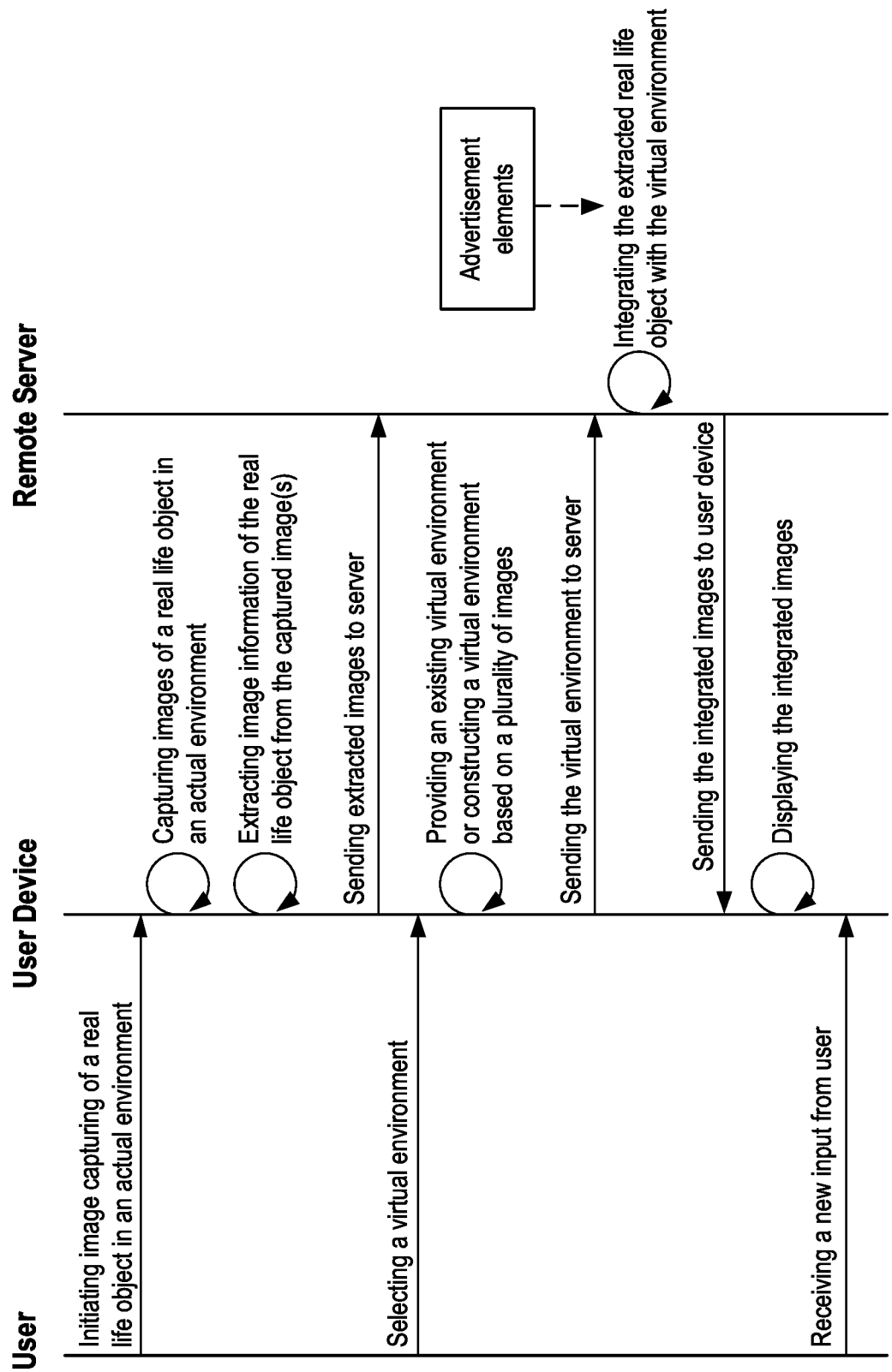
FIG. 3D depicts example steps and system according to the invention.

A user can also use the embodiments depicted in FIGS. 3B through 3D to create images or videos with assistance from one or more external servers. The images or videos can be for personal enjoyment or as a form of speech (e.g., including for advertisement). As disclosed herein, advertisement elements can be added in any one or multiple method steps that are performed on the server.

For advertisement provisioning, context information is used to create in real-time targeted-advertisement materials to viewers. For example, to promote the Olympics, a generic video about the games can be provided as the virtual environment. Different real life objects, for example, a celebrity, an actor, an athlete, a common user of a computer device can take a personal video of themselves, which will then be integrated with the virtual environment to create as many promotion video as possible.

In some embodiments, part of the advertisement videos can be taken before-hand, real-time integration occurs when a viewer requests the material. For example, when a person from China clicks a link on the official Olympic Game website, the server detects the person's geolocation and possibly other information, and creates a video specific for the person where an athlete from China will be featured in the video and different China-related elements will be incorporated into the generic video. And the video will be presented in Chinese, for example, using a voice that will be familiar to the person. When another person from the US clicks the same link, a different video will be created in real-time to provide the other person a different viewing experience, featuring a different athlete, different US-related elements, and English narration using a different voice familiar to people in the US.

As noted above, advertisement can be passively presented while engaging in other activities such as video conferencing or video gaming. Although users engaging in activities such as video conferencing or video gaming do not actively seek advertisement information, the context based content matching approach disclosed herein provides a seamless and relevant experience with embedded advertisement elements in a non-invasive way. Passive advisement as disclosed herein can be immersive and interactive, leading to fun experiences, in contrast to traditional advertisement, which is often considered a waste of time and causes unpleasant reactions from viewers. Passive advisement as disclosed herein can find numerous applications and generate enormous revenue.

For example, before or during a video conference, a user can select Hawaii as a theme option for the virtual environment. The system, in turn, can identify numerous possible advertisement elements that can be used as the virtual environment or as a part of the virtual environment. For example, the user's favorite destination in the past is Maui. Scenes from favored locations and activities in Maui can be presented as part of the virtual environment. Additionally, if the user likes to surf and another island in Hawaii offers better surfing experience than Maui, photos or videos of the other surfing destination may be presented to the user. The selected of advertisement elements can be done based context of the video conference as well. If the user is talking to friends and family, virtual environment with more family-oriented destinations or activities can be presented; for example, if the user has two young children, the virtual environment can include images or videos of more child-friendly activities. In some embodiments, destinations can be selected based on their respective distance to the user's favorite hotel on Maui.

Often, many types of advertisement content can be provided. Final selection of a particular type of content can be decided in a bidding process. An advertiser with appropriate content and the best pricing may be selected.

For the same user choosing Hawaii as a theme option for the virtual environment during video conferencing with a business partner, advertisement content with more tranquil characteristics will be presented. For example, a quite forest or a quite beach front scene from Hawaii may be selected to be part of the virtual environment. Again, there will be many options possible. The final selected again can be decided in a bidding process. An advertiser with appropriate content and the best pricing may be selected.

In another example, a person may passively participate in rendering advertisement material. For example, a traveler arriving at an airport can choose to view video material of the new destination via a system as disclosed herein. The traveler can interact with elements within the video material. The traveler can choose to create and save images and/or videos reflecting such fun interactions. In some embodiments, advertisement material can be embedded in the images and/or videos. In some embodiments, no advertisement material is embedded in the images and/or videos but the overall experience itself can be considered an advertisement. Such experience can be design for any purpose or to suit the need for any industry. For example, a cosmetic company can create a platform where a user gets to virtually try out different makeup products. Effects of the makeup products can be generated as virtual environment and merge with a user to create modified images or videos of the person wearing the makeup product. Similarly, a clothing company can intelligently present clothing options to a person based on user preferences. The clothing items can be created as virtual environment and merge with a user to create modified images or videos of the person wearing the clothing items.

Exemplary Embodiments

The systems and methods disclosed herein have many applications. For example, they can be used to create or modify images for presentation purposes; see for example, FIGS. 3A through 3D. Alternatively, they can be used to enable more effective real-time communication, as illustrated in FIGS. 4A through 4C and FIGS. 5A through 5C.

FIG. 3A illustrates a sample process where all functionalities are performed on a user device. In some embodiments, this can be enabled by a device such as user device 120. Here, a user can initiate image capture by turning on a depth-enabled camera that is attached to the user device or an integral part of the user device. A real life object here can be the user of the device or an object that is accessible by the device. For example, a photographer or videographer can operate the user device to collection images and videos of a real life object (e.g., a person, an animal, or combinations thereof).

Extraction of real life object follows image capture, which can take place automatically and concurrently with image capture. In some embodiments, a user can manually control when image extraction should start. For example, for image or video editing, a user can select when and where image extraction should start so that only the desired images or video portion will be processed.

In some embodiments, a user can select a virtual environment. The selection can take place after image extraction or concurrently with image extraction. In some embodiments, an existing virtual environment is selected. In some embodiments, a virtual environment can be constructed ad hoc after the user selection. In some embodiments, one or more features of the real life object can be considered when constructing the virtual environment. For example, when a real life object is intended to interact with elements of a virtual environment, the size or shape of the virtual environment may be adjusted for seamless integration.

Integration of the extracted real life object and the virtual environment can also take place automatically once data of extracted real life object and virtual environment become available. In some embodiments, a user can manually control when image integration should start. For example, also for image or video editing, a user can select when and where image integration should start so that only the desired images or video portion will be processed.

FIGS. 3B through 3D illustrate sample embodiments where functionalities are split between a user device and a remote server. As shown in FIG. 3B, except image capturing, which takes place on a user device, other processing steps including image extraction, provision or construction of virtual device, and integration of the two are all performed on the remote server. The integrated images are then transmitted back to user device for viewing. A user can choose to modify the integrated images by providing user input after viewing the integrated images.

In FIG. 3C, besides the image capturing step, the image extraction step also takes place on the user device. Provision or construction of virtual device, and integration of the two are both performed on the remote server. The integrated images are then transmitted back to user device for viewing.

In FIG. 3D, besides the image capturing step, image extraction and provision and construction of virtual environment also takes place on the user device. Only integration is performed on the remote server. The integrated images are then transmitted back to user device for viewing.

The processes illustrated in FIGS. 3A through 3D can be used for non-communication purposes, such as image and/or video editing, for creating real-time or non-real-time/deferred presentation materials including but not limited to personal videos, documentaries, news materials, educational materials, or advertisement material. Such processes can be interactive, a user can change or modify a command or selection at various points, including but not limited to the time when image capturing is initiated and the time when a virtual environment is selected. For example, a virtual education video about ancient Rome can be created ahead of time or in real-time. When a teacher shows the video in class, she may ask a student to participate as guide. Using a system as disclosed herein, a student can appear in the video as a virtual guide to ancient Rome.

A user can use the embodiment depicted in FIG. 3A to independently create images or videos without assistance from an external server. The images or videos can be for personal enjoyment or as a form of speech (e.g., including for advertisement). As disclosed herein, advertisement elements can be added in any one or multiple method steps.

For example, a real estate agent can create flyers by inserting a real-time image of himself into photos of a piece of property using existing photos of the property without having to retake photos. Additionally, the method here allows existing photos of the property to be enhanced by real-time modification when generating the integrated image.

As another example, a user can create small budget advertisement on a local user device, with or without assistance from a server. For example, an owner of a flower shop, can incorporate images of their specialty flower arrangement into her favorite scenes in a video clip.

A user can also use the embodiments depicted in FIGS. 3B through 3D to create images or videos with assistance from one or more external servers. The images or videos can be for personal enjoyment or as a form of speech (e.g., including for advertisement). As disclosed herein, advertisement elements can be added in any one or multiple method steps that are performed on the server.

The processes illustrated in FIGS. 3A through 3D can also apply to real-time communication. For example, the integrated images will be transmitted to another user device, either directly or indirectly via a server. Here, the choice of a virtual environment can be made by the user device transmitting the integrated images. The user device receiving the integrated images will see the virtual environment of the sending device's choosing. In some embodiments, the recipient user device can choose to turn off the virtual environment selected by the sending user device.

In some embodiments, one or more advertisement elements can be added during a communication process. The content of the advertisement elements can be determined based on a number of factors as illustrated in FIG. 2B. In some embodiments, the selected advertisement elements can be incorporated into the virtual environment. For example, when a person travels to San Francisco on business contacts his family, the virtual environment he selected may include advertisement for local gift shops. When he makes business conference call, however, the virtual environment he selected may include advertisements that are relevant to the operation of his company or industry. In these examples, the advertisement content is determined by the communication context.

FIGS. 4 and 5 provide further illustration of sample embodiments for real-time communication, where integration images are transmitted from one user device to another user device via network collection, via an intermediate service or directly.

Figure 4A:
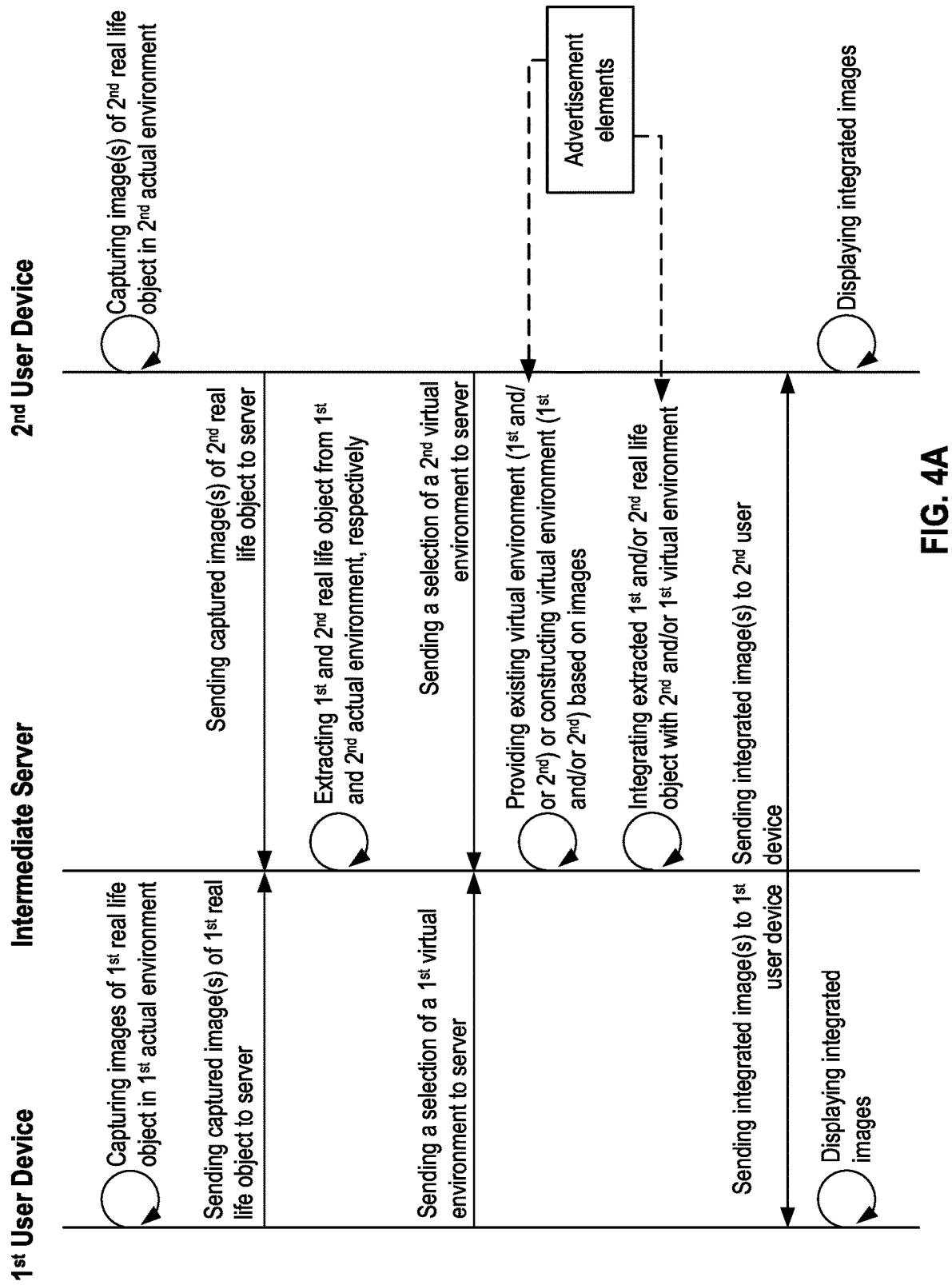
FIG. 4A depicts example steps and system for real-time image and signals processing between two user devices and an intermediate server.

FIG. 4A illustrates a sample embodiment where two user devices communicate with each other via an intermediate server. Other than image capturing, which takes place on a user device, other processing steps including image extraction, provision or construction of virtual device, and integration of the two are all performed on an intermediate server. Here, both the first user device and second user device send captured images of the respective real life object to the intermediate server, which then extracts the first and second real life objects from their respective actual environment.

The first user device sends a selection of a first environment to the server and the second user device sends a selection of a second environment to the server. In some embodiments, the server provides the selected virtual environments from a library of virtual environments stored in a database on the server. In some embodiments, the server constructs the respective virtual environments based on images provided by the user devices or selected from a database on the server. During integration, the extracted first real life object will be integrated with a virtual environment chosen by the second user device. Similarly, the extracted second real life object will be integrated with a virtual environment chosen by the first user device. Although it is possible to integrate an extracted real life object with the virtual environment of its own choosing, depicted in FIG. 4A is the preferred embodiment because images of the first real life object will be viewed at the second user device.

Figure 4B:
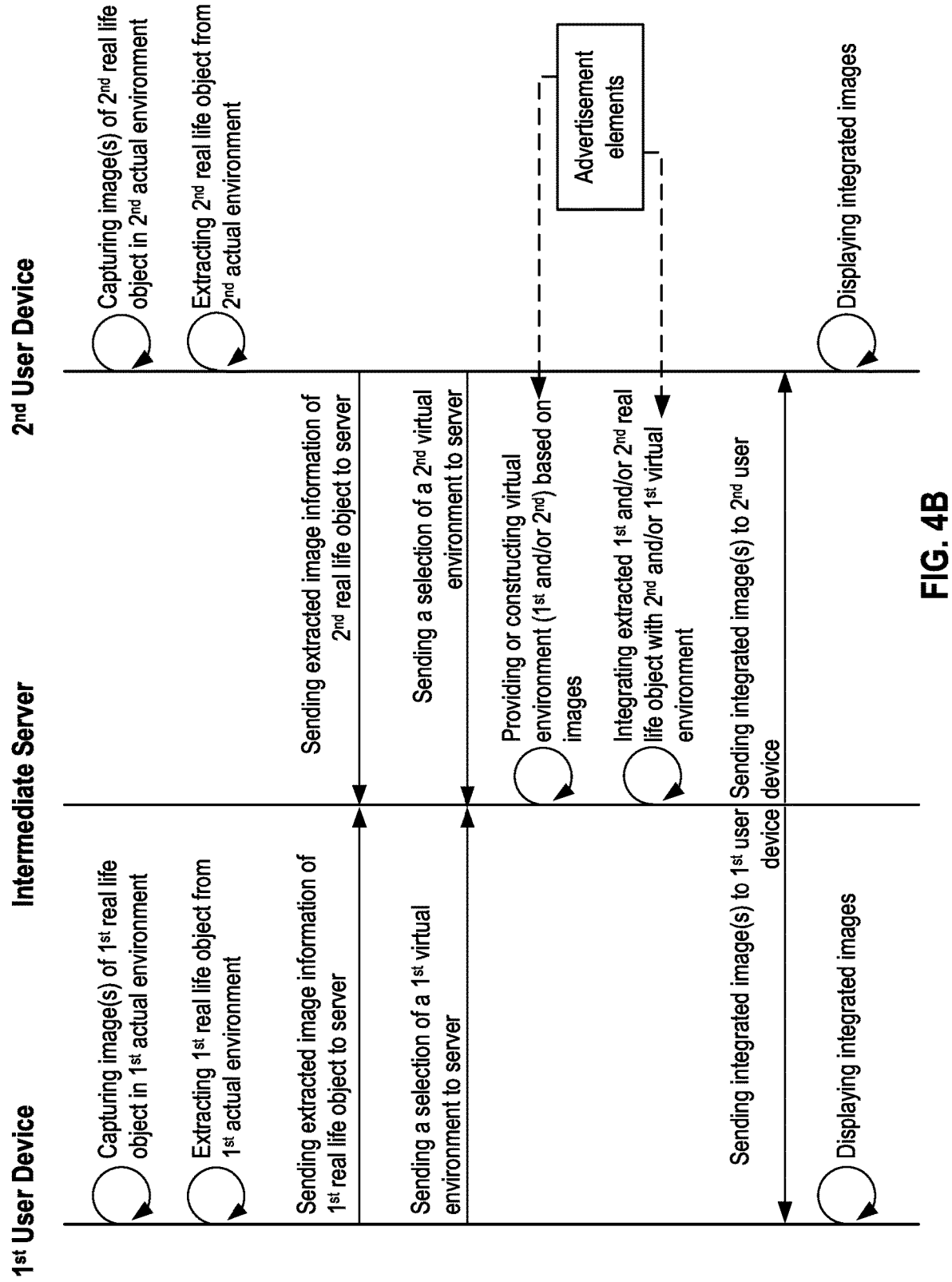
FIG. 4B depicts example steps and system for real-time image and signals processing between two user devices and an intermediate server.

FIG. 4B illustrates a sample process similar to that of FIG. 4A except that image extraction takes place on the user devices instead of on the intermediate server. The extracted images are then transmitted to the intermediate server. Virtual environments are still provided or constructed by the intermediate server. During integration, the extracted first real life object will be integrated with a virtual environment chosen by the second user device. Similarly, the extracted second real life object will be integrated with a virtual environment chosen by the first user device. Although it is possible to integrate an extracted real life object with the virtual environment of its own choosing, depicted in FIG. 4A is the preferred embodiment because images of the first real life object will be viewed at the second user device.

Figure 4C:
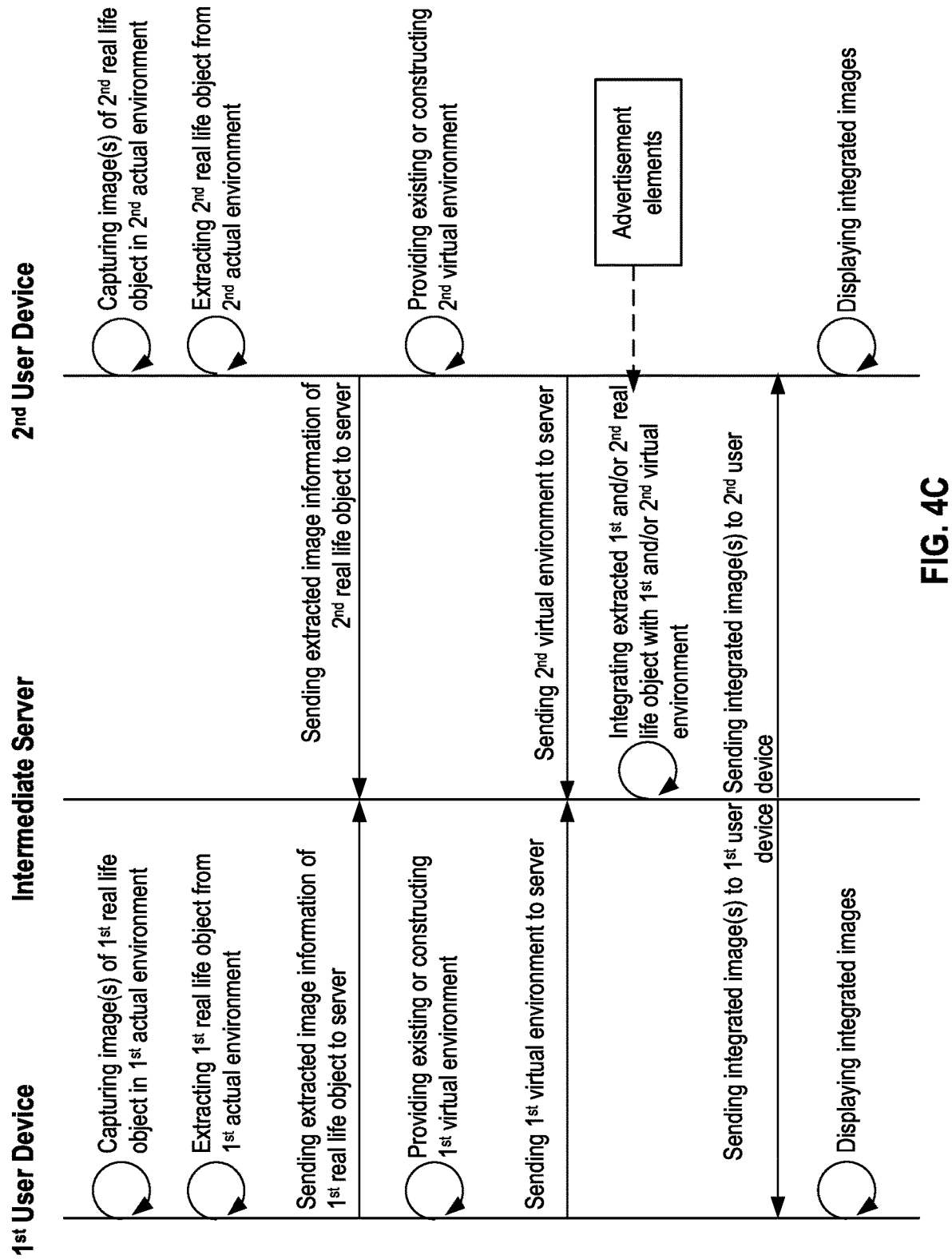
FIG. 4C depicts example steps and system for real-time image and signals processing between two user devices and an intermediate server.

FIG. 4C illustrates a sample process similar to those of FIGS. 4a and 4B. Here, an additional processing step takes place on the user devices. For example, in addition to image capture, image extraction and provision and construction of the virtual environment also take place on the user devices. The extracted images and virtual environment are then transmitted to the intermediate server. During integration, the extracted first real life object will be integrated with a virtual environment chosen by the second user device. Similarly, the extracted second real life object will be integrated with a virtual environment chosen by the first user device. Although it is possible to integrate an extracted real life object with the virtual environment of its own choosing, depicted in FIG. 4A is the preferred embodiment because images of the first real life object will be viewed at the second user device.

The sample embodiments depicted in FIGS. 4A to 4C allow a server to provide advertisement content while engaging the users in other activities such as video conferencing. In some embodiments, one or more advertisement elements can be added during a communication process. The content of the advertisement elements can be determined based on a number of factors, as illustrated in FIG. 2B.

In the embodiments shown in FIGS. 4A to 4C, the users do not actively seek advertisements so it is important that the advertisements be provided in a non-intrusive and yet relevant fashion, based on user preference and context information. In some embodiments, the selected advertisement elements can be incorporated into the virtual environment. For example, when a person travels to San Francisco on business contacts his family, the virtual environment selected may include advertisement for local gift shops. In addition, advertisements may be presented to his family as well during the conference call and the content can be selected, for example, based on the geolocation of his family.

When he makes business conference call, however, the virtual environment he selected may include advertisements that are relevant to the operation of his company or industry. Again, advertisements may be presented to the other callers as well during the conference call and the content can be selected, for example, based on the geolocation of their locations, and the operation of their companies or industries. In some embodiments, the same advertisement is presented. In some embodiments, different advertisements are presented to different participants. In these examples, the advertisement content is determined by the communication context.

Figure 5A:
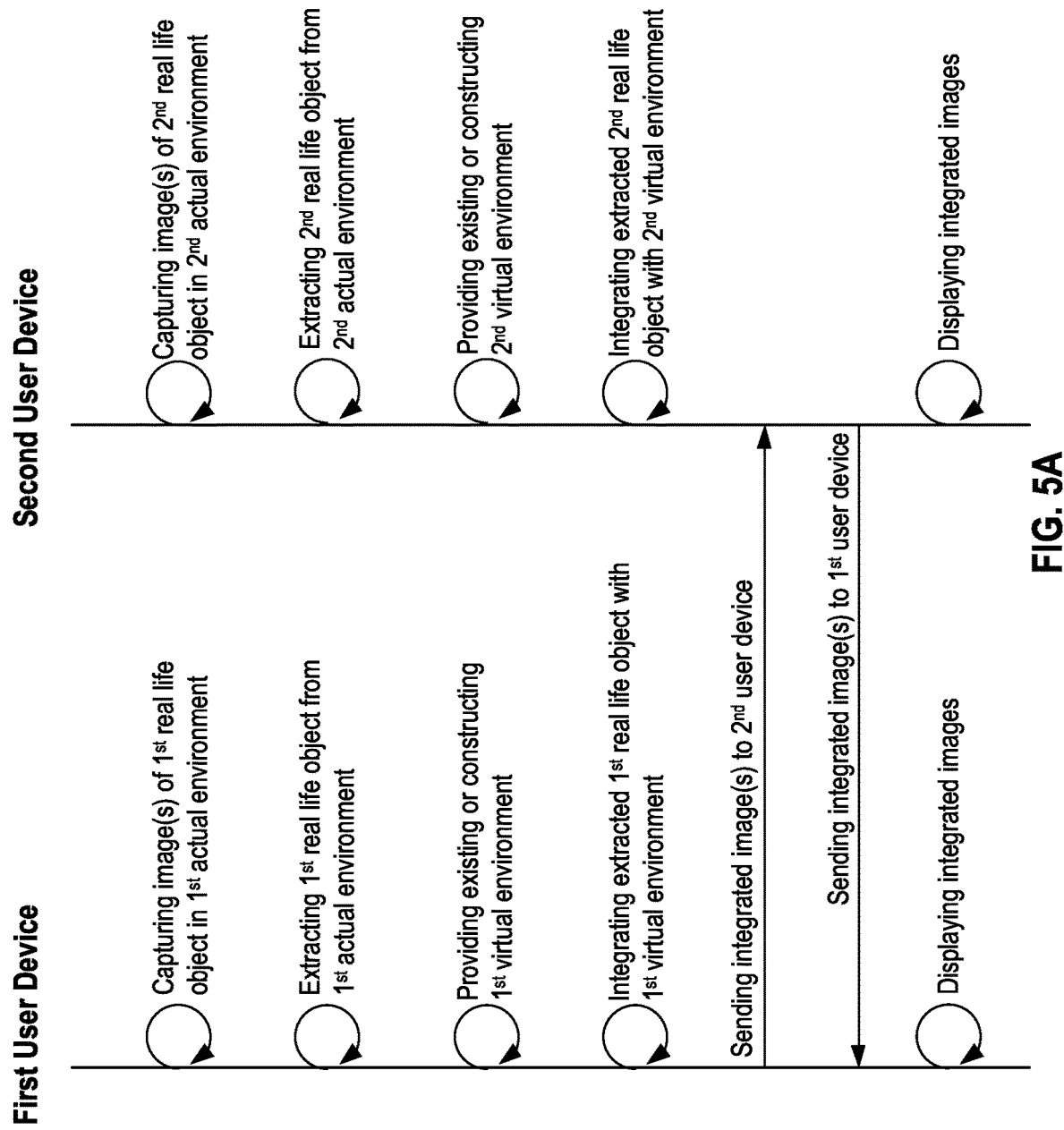
FIG. 5A depicts example steps and system for real-time image and signals processing between two user devices.
Figure 5B:
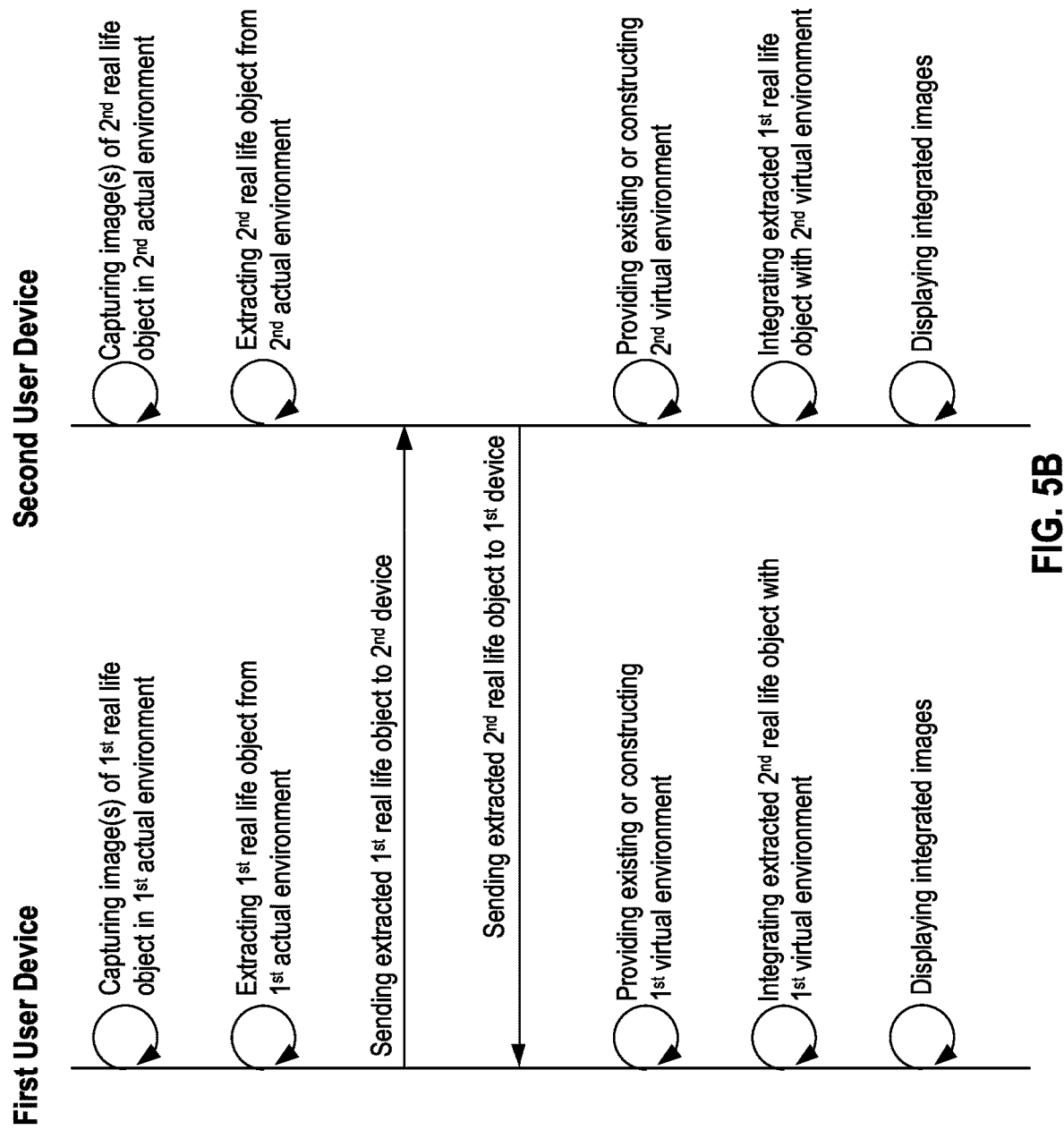
FIG. 5B depicts example steps and system for real-time image and signals processing between two user devices.
Figure 5C:
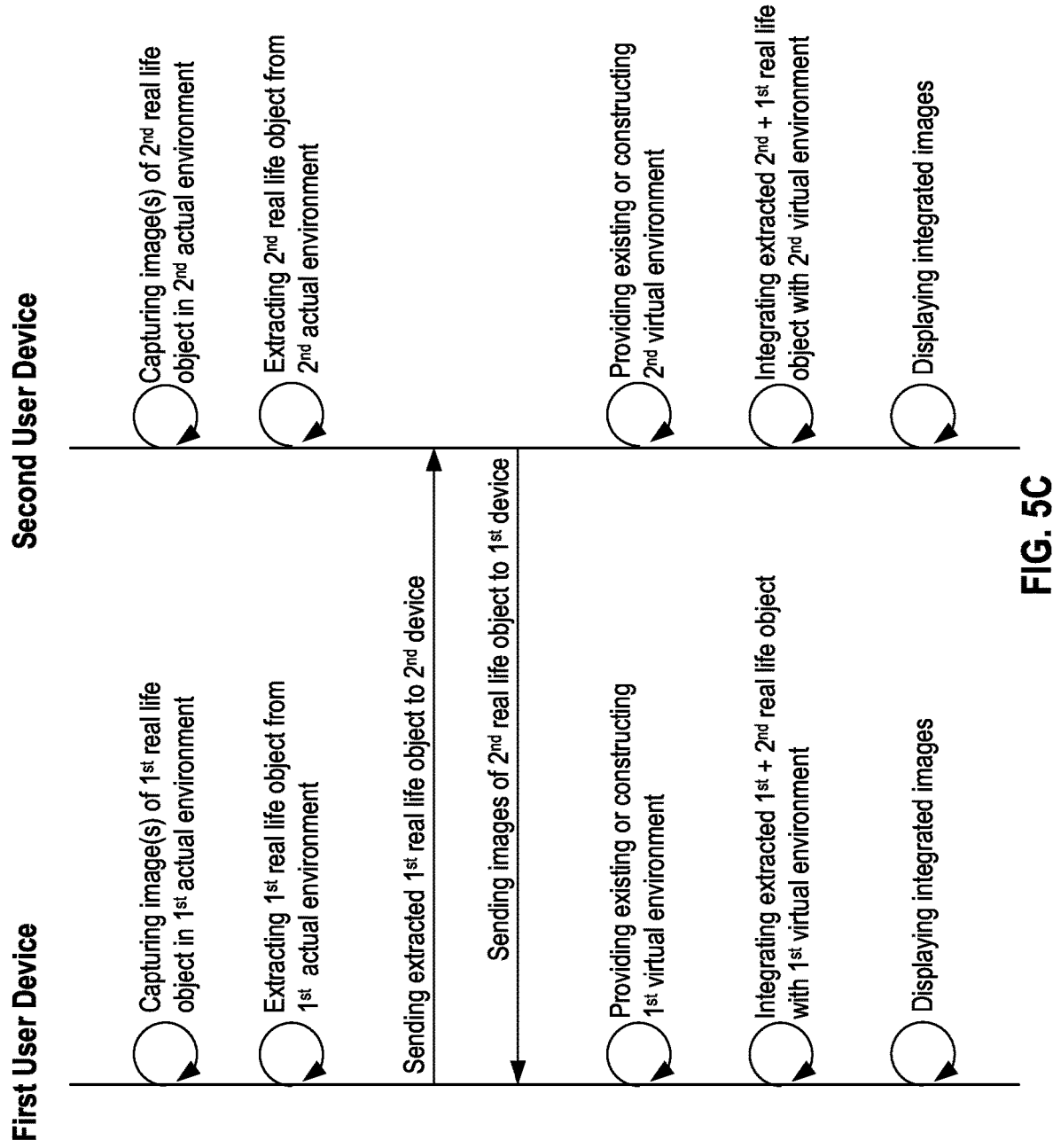
FIG. 5C depicts example steps and system for real-time image and signals processing between two user devices.

FIGS. 5A to 5C illustrate sample embodiments where user devices directly communicate with each other without an intermediate server.

In FIG. 5A, each user device in two user devices captures images, extracts image, provides/constructs a virtual environment and integrates the extracted real life object with the virtual environment. The integrated images are transmitted, e.g., via Bluetooth™ or wireless connection to the other user device for display. Again, this may not be a preferred environment because a user at one user device will be forced to view a virtual environment selected by the other device.

FIG. 5B illustrates an example embodiment where a user at one device can view integrated images in a virtual environment of its own choosing. For example, a first user device captures image of a first real life object in a first actual environment. The first real life object is then extracted and sent to the second user device, which is then integrated into a second virtual environment selected at the second user device. Similarly, a second user device captures image of a second real life object in a first actual environment. The second real life object is then extracted and sent to the first user device, which is then integrated into a first virtual environment selected at the second user device. In such embodiments, respective users can view the party they are communicating in their preferred virtual environment.

FIG. 5C illustrates an example embodiment where a user at one device can view integrated images in a virtual environment of its own choosing. For example, a first user device captures image of a first real life object in a first actual environment. The first real life object is then extracted and sent to the second user device, which is then integrated into a second virtual environment selected at the second user device. Similarly, a second user device captures image of a second real life object in a first actual environment. The second real life object is then extracted and sent to the first user device, which is then integrated into a first virtual environment selected at the second user device. In such embodiments, respective users can view the party they are communicating in their preferred virtual environment.

The processes illustrated in FIGS. 4 and 5 can be used for real-time communication purposes. Such communications include but are not limited to video conferences, interactive gaming, interactive news materials, interactive educational materials, or interactive advertisement material. For example, a virtual education video about ancient Rome can be created ahead of time or in real-time. When a teacher shows the video in class, she may ask a student to participate as guide. Using a system as disclosed herein, a student can appear in the video as a virtual guide to ancient Rome.

Although the examples provided in FIGS. 4 and 5 both refer to a two party communication system, it by no means limits the scope of the invention to such. The methods and systems disclosed herein can work with any number of participants so long as such communication mode is supported.

The systems and methods illustrated in FIGS. 1-5 described hereinabove offer numerous advantages, in particular in connection with real-time image and signal processing for AR-based image and video editing and AR-based real-time communications. For example, the systems and methods disclosed herein allow accuracy, efficiency, convenience, and flexibility, and can be implemented in numerous applications.

The method and system disclosed herein further fuse music and environmental sound that fit for scenes in the integrated images/videos. Additionally, proper translated language voice is used to further augment the sound and experience. Over all, method and system disclosed herein would provide very immersive visual and audio experience to the users so that they feel like being in the same environment even though they are physically far away from one another.

The following outlines a number of examples where the method and system can be implemented. The method and system can be used for AR-based video conferencing. The method and system help to protect user privacy and allow a user to choose a preferable environment to view other participants of the conference.

The method and system can be used for AR-based video conferencing with embedded marketing applications. A user or enterprise can insert marketing messages, advertisements into the AR-based video conferencing, which provides exposure to products or services to users participating in the video conference.

The method and system can also be used for AR-based video recording and editing. A user can create videos of themselves being in any conceivable environment in the universe. It makes the green-screen video photographing obsoleted. This allows the user to do time travel; e.g., visiting Rome in its most glorious days. This can be done for educational purposes or just for fun.

The method and system create a seamless and immersive environment, allowing people to meet virtually as if they were in the same place while being physically located across vast geographic distances.

The method and system allows users who speak different language to communicate freely with each other.

It will be understood that a user can use any applicable methods and/or systems to enhance the experience with material production and presentation, as well as active and passive advertisement experience. For example, such methods and systems include those disclosed in U.S. application Ser. No. 15/367,124 filed on Dec. 1, 2016 and entitled "methods and systems for personalized, interactive and intelligent searches", which is hereby incorporated by reference in its entirety.

Example System Architecture

Figure 6:
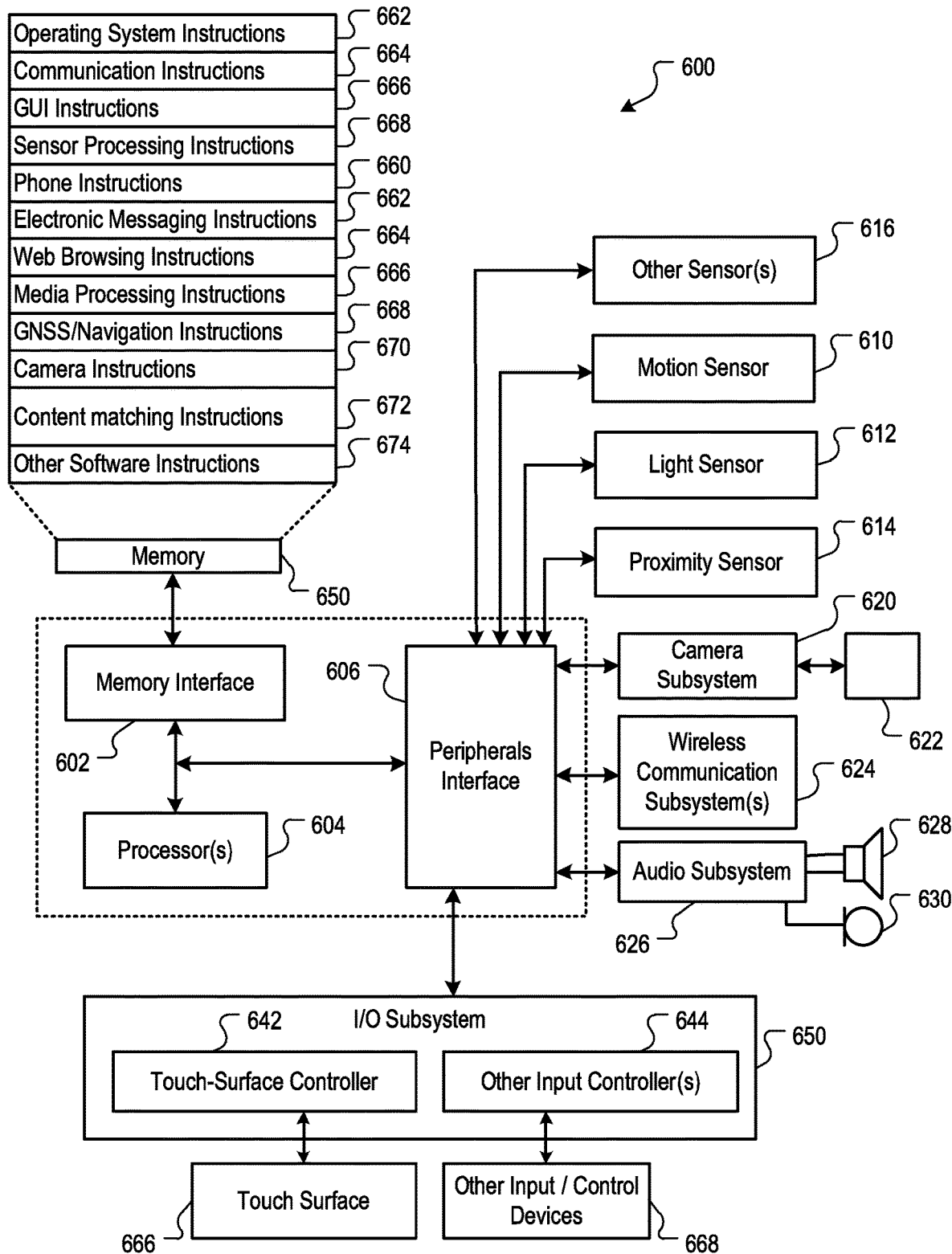
FIG. 6 depicts a block diagram of an example system architecture for implementing the features and processes of FIGS. 1-5.

FIG. 6 is a block diagram of an example computing device 600 that can implement the features and processes of FIGS. 1-6. The computing device 600 can include a memory interface 602, one or more data processors, image processors and/or central processing units 604, and a peripherals interface 606. The memory interface 602, the one or more processors 604 and/or the peripherals interface 506 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), an accelerometer, a gyro sensor, a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis. For example, camera subsystem 620 includes but is not limited to 2D camera, 3D camera, combination of 2D/3D camera, Infrared camera, near infrared camera, ultra violet camera, multiple spectrum camera, hyperspectral camera, and combination of multiple cameras.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network, and etc. In particular, the wireless communication subsystems 624 can include hosting protocols such that the device 120 can be configured as a base station for other wireless devices. Exemplary wireless system 624 includes but is not limited to wireless internet (WLAN, wifi, etc.), wired internet, Bluetooth, 2G/3G/4G/5G wireless, etc.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voice printing and voice authentication, for example. An audio subsystem 626 includes but is not limited to regular microphone, HD microphone, stereo microphone, and combination of multiple microphones.

The I/O subsystem 640 can include a display/touch-surface controller 642 and/or other input controller(s) 644. The display controller 642 can be coupled to a display device 646 such as touch surface. The display/touch surface device 646 and associated display controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with display/touch surface 646. They can be AR glass display, or regular display (mobile phone display, TV display, etc.)

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the display device 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The display device 646 can, for example, also be used to implement virtual or soft buttons and/or a keyboard.

A user can provide real-time feedback via one or more components of I/O subsystem 640, other input controllers 644 or any other types of input-output modules.

In some implementations, the computing device 600 can present recorded audio and/or video files, such as MP3, AAC, and MPEG files. In some implementations, the computing device 500 can include a smartphone, a tablet device, a laptop computer, or a wearable device (e.g., smart watch, smart glasses, etc.), a gaming system, an AR-based device, and/or an MR-based system. Exemplary AR devices include AR glass goggles (e.g., Microsoft Hololens, Epson® Moverio glasses, etc.), and AR headset (e.g., Oakley airwave, etc.). Exemplary MR system includes Microsoft Kinect in combination with an Xbox and a display; Intel realsense camera in combination with a computer, and etc. Exemplary smart-phone based AR systems can include virtually any smart phones that are equipped with a camera/mic and other sensors.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the image processing features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store image and signal processing instructions 672 to facilitate other processes and functions, such as the image processing processes and functions as described with reference to FIGS. 1-6.

The memory 650 can also store other software instructions 674, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Figure 7:
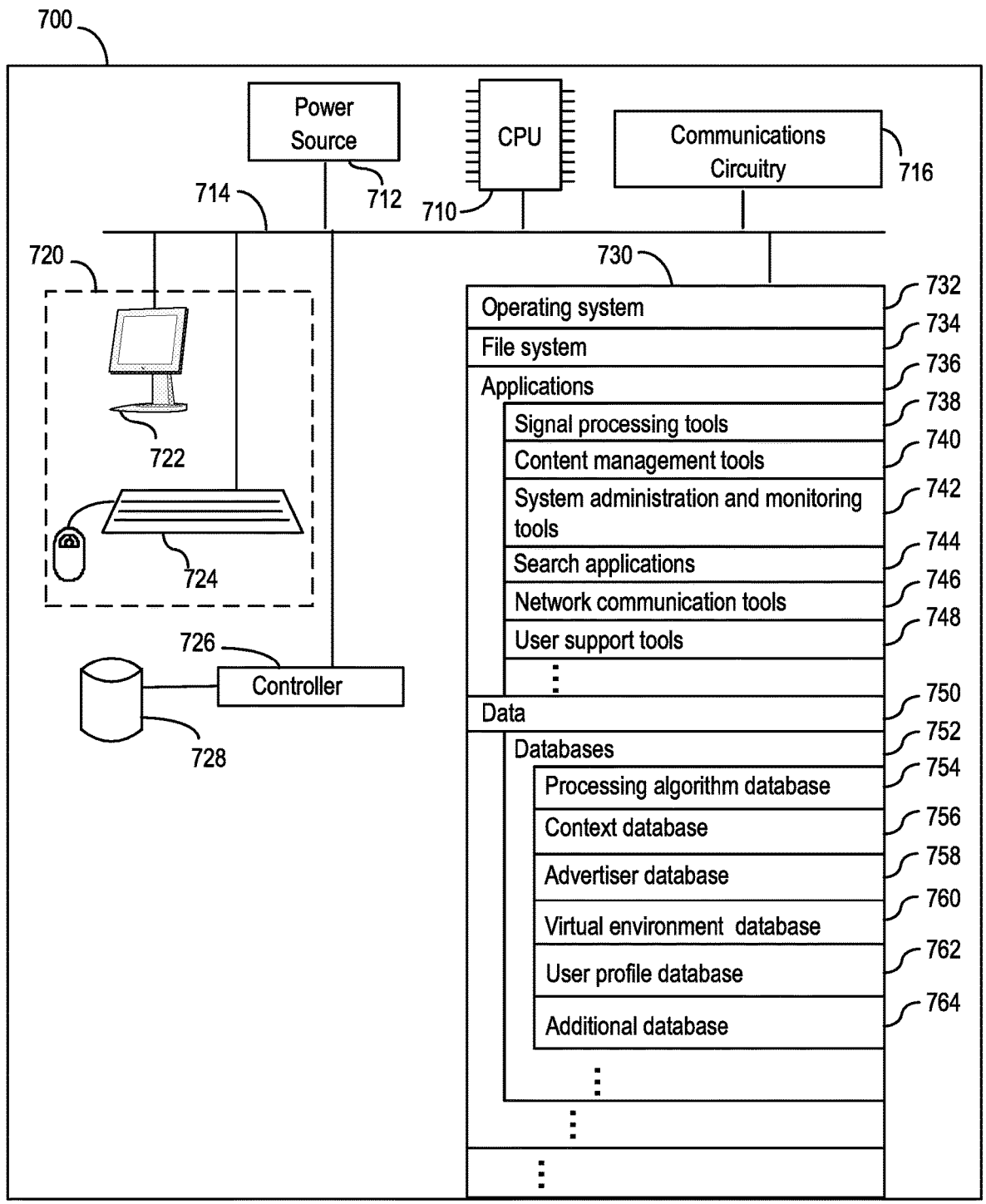
FIG. 7 depicts a block diagram of an example system architecture implementing for the features and processes of FIGS. 1-5.

FIG. 7 depicts a block diagram of an example remote server system architecture implementing for the features and processes of FIGS. 1-5.

In some embodiments, remote data server 700 may comprise a central processing unit 710, a power source 712, a user interface 720, communications circuitry 716, a bus 714, a controller 726, an optional non-volatile storage 728, and at least one memory 730.

Memory 730 may comprise volatile and non-volatile storage units, for example random-access memory (RAM), read-only memory (ROM), flash memory and the like. In preferred embodiments, memory 730 comprises high-speed RAM for storing system control programs, data, and application programs, e.g., programs and data loaded from non-volatile storage 728. It will be appreciated that at any given time, all or a portion of any of the modules or data structures in memory 730 can, in fact, be stored in memory 728.

User interface 720 may comprise one or more input devices 724, e.g., keyboard, key pad, mouse, scroll wheel, and the like, and a display 722 or other output device. A network interface card or other communication circuitry 716 may provide for connection to any wired or wireless communications network, which may include the Internet and/or any other wide area network, and in particular embodiments comprises a telephone network such as a mobile telephone network. Internal bus 714 provides for interconnection of the aforementioned elements of centralized data server 700.

In some embodiments, operation of centralized data server 700 is controlled primarily by operating system 732, which is executed by central processing unit 710. Operating system 732 can be stored in system memory 730. In addition to operating system 732, a typical implementation system memory 730 may include a file system 734 for controlling access to the various files and data structures used by the present invention, one or more application modules 736, and one or more databases or data modules 750.

In some embodiments in accordance with the present invention, applications modules 736 may comprise one or more of the following modules described below and illustrated in FIG. 7.

Signal Processing Application 738. In some embodiments in accordance with the present invention, a signal processing application 738 receives and processes signals transmitted to the server from user devices, including but not limited images, audio, or video.

By applying computation techniques (e.g., hash functions), signal processing application 738 turns input data, sensor data, network derived data into digital data to construct one or more databases 752 (e.g., 754-774).

Content Management Tools 740. In some embodiments, content management tools 640 are used to organize different forms of databases 752 into multiple databases, e.g., a processing mechanism database 754, a geolocation database 756, a network based trending database 758, a virtual environment database 760, a user profile and authentication database 762 and additional database 764 such as advertisement content. In some embodiments in accordance with the present invention, content management tools 740 are used to search and compare any of the databases hosted on the remote data server 700. Contents in accordance with the invention may be a text message, a URL, a web link, a note message, a post message, sensor data, a file, an image, an audio file, a video file, a flash file, a media file, a slideshow file, or any printable or visualizable file.

The databases stored on remote data server 700 comprise any form of data storage system including, but not limited to, a flat file, a relational database (SQL), and an on-line analytical processing (OLAP) database (MDX and/or variants thereof). In some specific embodiments, the databases are hierarchical OLAP cubes. In some embodiments, the databases each have a star schema that is not stored as a cube but has dimension tables that define hierarchy. Still further, in some embodiments, the databases have hierarchy that is not explicitly broken out in the underlying database or database schema (e.g., dimension tables are not hierarchically arranged). In some embodiments, the databases in fact are not hosted on remote data server 700 but are in fact accessed by centralized data server through a secure network interface. In such embodiments, security measures such as encryption is taken to secure the sensitive information stored in such databases.

System Administration and Monitoring Tools 742. In some embodiments in accordance with the present invention, system administration and monitoring tools 742 administer and monitor all applications and data files of remote data server. Because personalized data such as biometrics are stored on remote data server 700, it is important that access those files that are strictly controlled and monitored. System administration and monitoring tools 742 determine which user devices have access to remote data server 700 based on strict user authentication. In some embodiments, multiple rounds of authentication may be needed. In some embodiments, system administration and monitoring tools 742 use more than one security measure to protect the data stored on remote data server 700. In some embodiments, a random rotational security system may be applied to safeguard the data stored on remote data server 700.

Network Application 746. In some embodiments, network applications 746 connect a remote data server 700 through multiple network services. A remote data server 600 is connected to multiple types of user devices, which requires that remote data server be adapted to communications based on different types of network interfaces, for example, router based computer network interface, switch based phone like network interface, and cell tower based cell phone wireless network interface, for example, an 802.11 network or a Bluetooth network.

Customer Support Tools 748. Customer support tools 748 assist users with information or questions regarding their accounts, technical support, privacy or feedback on advertisement experience, etc. In some embodiments, a user may request (e.g., through real-time voice, text or gesture commands) to turn and off the advertisement experience.

In some embodiments, each of the data structures stored on remote data server 700 is a single data structure. In other embodiments, any or all such data structures may comprise a plurality of data structures (e.g., databases, files, and archives) that may or may not all be stored on remote data server 700. The one or more data modules 750 may include any number of databases 752 organized into different structures (or other forms of data structures) by content management tools 740:

In addition to the above-identified modules, data 750 may also be stored on remote data server 700. Exemplary databases 752 include processing mechanism database 754, context database 756, advertiser database 758, virtual environment database 760, and user profile and authentication dataset 762, which are described below in more details.

Processing Mechanism Database 754. Any applicable mechanisms may be stored in processing mechanism database 754. Such mechanisms are not limited to those for captured signal data. Additional mechanisms such as those used for processing virtual environment or post-production processing of the integrated images or videos can also be stored in processing mechanism database 754.

Context Database 756. In some embodiments, remote data server 700 hosts a context database 756. Context database 756 stores and organizes context related data such as date and time information, communication context, content context, advertiser context, geolocation context, presentation context, or combinations thereof time, weather, location-related events, history, map, and news and etc. The information here can provide context information when the server selects appropriate advertisement content for a user. In some embodiments, trending data including recent popular queries, events, domain knowledge and other related information can be used to as context information. The information can be real-time updated to provide context information when the server selects appropriate advertisement content for a user.

Advertiser Database 758. As disclosed herein, information associated or specified by advertisers is stored in advertiser database 758. In some embodiments, an advertiser can specify preference for certain platform. In some embodiments, an advertiser can set pricing information for participating in bidding processes.

Virtual Environment Database 760. In some embodiments, virtual environment or images/videos for constructing such virtual environment are stored in virtual environment database 760. Additionally, a user's past preference for one or more types of modification can be used to guide and help modify future virtual environment. In some embodiments, previous preferences for virtual environment or modifications and variations thereof may be stored and organization in connection with the corresponding user profiles (e.g., from user profile database 762), thus providing user-specific advertisement content.

User Profile Database 762. In some embodiments in accordance with the present invention, a user profile database 762 may be created and stored on remote data server 700 where passwords and authentication data concerning the users are stored and managed. In some embodiments, users are given the opportunity to choose security settings. In some embodiments, user preference information is also included in user profile database. Exemplary user preference information includes but is not limited to user specified information, user biographical information, user behavior information, user activities, user psychological status, user socioeconomic status, user real-time request information, or combinations thereof.

The present invention can be implemented as a computer system and/or a computer program product that comprises a computer program mechanism embedded in a computer readable storage medium. Further, any of the methods of the present invention can be implemented in one or more computers or computer systems. Further still, any of the methods of the present invention can be implemented in one or more computer program products. Some embodiments of the present invention provide a computer system or a computer program product that encodes or has instructions for performing any or all of the methods disclosed herein. Such methods/instructions can be stored on a CD-ROM, DVD, magnetic disk storage product, flash drive, or any other computer readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

Some embodiments of the present invention provide a computer system or a computer program product that contains any or all of the program modules as disclosed herein. These program modules can be stored on a CD-ROM, DVD, flash drive, magnetic disk storage product, or any other computer readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

I claim:

1. A method for providing intelligent personalized immersive advertisement, comprising:
   identifying, at a computer device, a user in real time, one or more user characteristics using machine-learning based mechanism;
   identifying a context information, wherein the context information comprises communication context, content context, geolocation context, presentation context, or combinations thereof;
   determining one or more advertisement elements based on the user characteristics, the context information, and an advertising context information using machine-learning based mechanism;
   Rendering, at the computer device to the user and in real time, a plurality of integrated images of an extracted real life object in real-time and immersed in a virtual environment, wherein the plurality of integrated images comprises one or more advertisement elements, and context information, and wherein each pixel in the integrated image is divided into multiple layers, each layer is determined using corresponding pixels in the extracted real life object and each image of the plurality of images of the virtual environment based on image relations between each pixel of the extracted real life object and a corresponding pixel of each image of the plurality of images of the virtual environment, and the image relations comprise at least a depth relation or a transparency relation; and
   displaying the advertisement in the virtual environment based on real-time integrated images.

2. The method of claim 1, wherein the user characteristics comprises user specified information, user biographical information, user behavior information, user psychological status, user socioeconomic status, or combinations thereof.

3. The method of claim 1, further comprising:
   identifying the user preference information, wherein the user preference information comprising previous user reference information, real-time user activities, user real-time request information, or combinations thereof;
   determining one or more advertisement elements based on user reference information.

4. The method of claim 1, wherein the advertising context comprises advertiser-specified content matching criteria including favored or disfavored presentation forums or pricing information.

5. The method of claim 1, wherein the one or more advertisement elements are determined in a bidding process.

6. The method of claim 1, wherein the extracted real life object comprises multi-dimensional image information extracted by separating the real life object from its actual environment in one or more real-time captured images based on a plurality of factors comprising advertisement content, user preference information, and context information.

7. The method of claim 1, wherein the one or more advertisement elements are embedded into the plurality of integrated images in real-time when extracting image information of the real life object, or constructing the virtual environment.

8. The method of claim 1, comprising:
   providing, at the computer device and in real-time, one or more audio tracks, the one or more audio tracks comprising audio information associated with the plurality of integrated images.

9. The method of claim 1, wherein the plurality of integrated images forms a video comprising one or more audio tracks.

10. The method of claim 8, wherein the one or more audio tracks comprise audio information concerning the one or more advertisement elements.

11. The method of claim 8, wherein the one or more audio tracks comprise a translation audio track of the built-in audio track, the translation audio track being automatically provided in real-time in multiple languages based on the user characteristics, context information, advertisement elements, or combinations thereof.

12. The method of claim 1, wherein the plurality of extracted real life objects includes a celebrity, an actor, an athlete, or a user of the computer device.

13. The method of claim 1, wherein the extracted real-life object interacts with one or more elements of the virtual environment in the plurality of integrated images in real-time.

14. The method of claim 1, wherein the virtual environment comprises an element reflecting the location of the computer device.

15. A computer system comprising:
   one or more processors; and
   a memory accessible to the one or more processors, the memory storing instructions executable by the one or more processors to:
   identify, at a computer device, a user in real time, one or more user characteristics using machine-learning based mechanism;
   identify a context information, wherein the context information comprises communication context, content context, geolocation context, presentation context, or combinations thereof;

determine one or more advertisement elements based on the user characteristics, the context information, and an advertising context information using machine-learning based mechanism; and Render, at the computer device to the user and in real time, a plurality of integrated images of an extracted real life object in real-time and immersed in a virtual environment, wherein the plurality of integrated images comprises one or more advertisement elements, and context information, and wherein each pixel in the integrated image is divided into multiple layers, each layer is determined using corresponding pixels in the extracted real life object and each image of the plurality of images of the virtual environment based on image relations between each pixel of the extracted real life object and a corresponding pixel of each image of the plurality of images of the virtual environment, and the image relations comprise at least a depth relation or a transparency relation;

displaying the advertisement in the virtual environment based on real-time integrated images.

16. A non-transitory computer-readable medium containing instructions that, when executed by a computer processor, cause the computer processor to:

identify, at a computer device, a user in real time, one or more user characteristics using machine-learning based mechanism;

identify a context information, wherein the context information comprises communication context, content context, geolocation context, presentation context, or combinations thereof;

determine one or more advertisement elements based on the user characteristics, the context information, and an advertising context information using machine-learning based mechanism; and Render, at the computer device to the user and in real time, a plurality of integrated images of an extracted real life object in real-time and immersed in a virtual environment, wherein the plurality of integrated images comprises one or more advertisement elements, and context information, and wherein each pixel in the integrated image is divided into multiple layers, each layer is determined using corresponding pixels in the extracted real life object and each image of the plurality of images of the virtual environment based on image relations between each pixel of the extracted real life object and a corresponding pixel of each image of the plurality of images of the virtual environment, and the image relations comprise at least a depth relation or a transparency relation;

displaying the advertisement in the virtual environment based on real-time integrated images.

17. The system of claim 15, comprising:

providing, at the computer device and in real-time, one or more audio tracks, one or more audio tracks comprising audio information associated with the plurality of integrated images.

18. The non-transitory computer-readable medium of claim 16, comprising:

providing, at the computer device and in real-time, one or more audio tracks, one or more audio tracks comprising audio information associated with the plurality of integrated images.

19. The method of claim 1, wherein the virtual environment includes one or more virtual objects.

* * * * *